United States Patent
Ye et al.

(10) Patent No.: US 10,390,029 B2
(45) Date of Patent: Aug. 20, 2019

(54) SYSTEMS AND METHODS FOR PROVIDING 3D LOOK-UP TABLE CODING FOR COLOR GAMUT SCALABILITY

(71) Applicant: Vid Scale, Inc., Wilmington, DE (US)

(72) Inventors: Yan Ye, San Diego, CA (US); Jie Dong, San Diego, CA (US); Yuwen He, San Diego, CA (US)

(73) Assignee: VID SCALE, Inc., Wilmington, DE (US)

(*) Notice: Subject to any disclaimer, the term of this patent is extended or adjusted under 35 U.S.C. 154(b) by 0 days.

(21) Appl. No.: 15/933,349

(22) Filed: Mar. 22, 2018

(65) Prior Publication Data
US 2018/0213241 A1    Jul. 26, 2018

Related U.S. Application Data

(63) Continuation of application No. 15/022,386, filed as application No. PCT/US2014/056608 on Sep. 19, 2014, now Pat. No. 9,955,174.

(Continued)

(51) Int. Cl.
*H04N 9/804* (2006.01)
*H04N 19/186* (2014.01)
(Continued)

(52) U.S. Cl.
CPC .......... *H04N 19/186* (2014.11); *G06T 9/40* (2013.01); *H04N 1/64* (2013.01); *H04N 19/147* (2014.11);
(Continued)

(58) Field of Classification Search
CPC ..... H04N 19/186; H04N 19/147; H04N 19/33
See application file for complete search history.

(56) References Cited

U.S. PATENT DOCUMENTS

| 5,504,821 A | 4/1996 | Kanamori et al. |
|---|---|---|
| 5,737,032 A | 4/1998 | Stenzel et al. |

(Continued)

FOREIGN PATENT DOCUMENTS

| CN | 1620150 A | 5/2005 |
|---|---|---|
| CN | 1859576 A | 11/2006 |

(Continued)

OTHER PUBLICATIONS

Alshina, Elena, "AhG14: On Bit-Depth Scalability Support", Samsung Electronics, Ltd., JCTVC-N0218, 14th Meeting: Vienna, AT, Jul. 25-Aug. 2, 2013, 6 pages.

(Continued)

*Primary Examiner* — Gregory M Desire
(74) *Attorney, Agent, or Firm* — Condo Roccia Koptiw LLP

(57) ABSTRACT

Systems and methods for improving efficiency in three-dimensional (3D) look-up table (LUT) coding and/or reducing table size of a 3D LUT may be provided. For example, octants associated with the 3D LUT may be provided for color space segmentation and coding may be performed on an octree associated with the octants where coding may include encoding nodes of the octree associated with the octants and corresponding vertices of the 3D LUT belonging to the nodes. The 3D LUT may also be signaled (e.g., based on a sequence and/or picture level).

18 Claims, 15 Drawing Sheets

Related U.S. Application Data

(60) Provisional application No. 61/880,715, filed on Sep. 20, 2013.

(51) Int. Cl.
    G06T 9/40      (2006.01)
    H04N 1/64      (2006.01)
    H04N 19/96     (2014.01)
    H04N 19/463    (2014.01)
    H04N 19/33     (2014.01)
    H04N 19/34     (2014.01)
    H04N 19/147    (2014.01)
    H04N 19/597    (2014.01)

(52) U.S. Cl.
    CPC ............. *H04N 19/33* (2014.11); *H04N 19/34* (2014.11); *H04N 19/463* (2014.11); *H04N 19/597* (2014.11); *H04N 19/96* (2014.11)

(56) References Cited

U.S. PATENT DOCUMENTS

| | | | |
|---|---|---|---|
| 5,995,165 | A | 11/1999 | Oh |
| 6,301,393 | B1 | 10/2001 | Spaulding et al. |
| 6,400,843 | B1 | 6/2002 | Shu et al. |
| RE37,940 | E | 12/2002 | Imao et al. |
| 7,684,084 | B2 | 3/2010 | Fan et al. |
| 8,908,761 | B2 | 12/2014 | Nilsson et al. |
| 9,270,871 | B2 | 2/2016 | Pahalawatta et al. |
| 9,538,176 | B2 | 1/2017 | Tourapis |
| 9,549,194 | B2 | 1/2017 | Ye et al. |
| 9,673,936 | B2 | 6/2017 | Dharmapurikar et al. |
| 9,756,337 | B2 * | 9/2017 | Li ................. H04N 19/136 |
| 9,955,174 | B2 * | 4/2018 | Ye ..................... G06T 9/40 |
| 9,973,766 | B2 * | 5/2018 | Nakagami ........ H04N 19/34 |
| 2005/0219574 | A1 | 10/2005 | Ok et al. |
| 2006/0119870 | A1 * | 6/2006 | Ho ................ H04N 1/6058 358/1.9 |
| 2006/0126962 | A1 | 6/2006 | Sun |
| 2006/0209959 | A1 | 9/2006 | Sun |
| 2006/0274335 | A1 | 12/2006 | Wittenstein |
| 2008/0175497 | A1 | 7/2008 | Segall |
| 2008/0205513 | A1 | 8/2008 | Xiong et al. |
| 2009/0002782 | A1 | 1/2009 | Kulkarni et al. |
| 2009/0003458 | A1 | 1/2009 | Au et al. |
| 2010/0020866 | A1 | 1/2010 | Marpe et al. |
| 2010/0082703 | A1 | 4/2010 | Zhou et al. |
| 2011/0234620 | A1 | 9/2011 | Koyama |
| 2012/0001963 | A1 | 1/2012 | Hinnen et al. |
| 2012/0014455 | A1 | 1/2012 | Joshi et al. |
| 2012/0224640 | A1 | 9/2012 | Sole Rojals et al. |
| 2013/0077696 | A1 | 3/2013 | Zhou |
| 2013/0156311 | A1 | 6/2013 | Choi et al. |
| 2014/0281836 | A1 | 9/2014 | Dharmapurikar et al. |
| 2015/0172670 | A1 | 6/2015 | Li et al. |
| 2015/0271509 | A1 * | 9/2015 | Minoo ............... H04N 19/33 375/240.29 |
| 2016/0295219 | A1 | 10/2016 | Ye et al. |

FOREIGN PATENT DOCUMENTS

| | | |
|---|---|---|
| CN | 101005620 A | 7/2007 |
| CN | 101449476 A | 6/2009 |
| CN | 101977316 A | 2/2011 |
| CN | 103004192 A | 3/2013 |
| CN | 103167295 A | 6/2013 |
| CN | 103404144 A | 11/2013 |
| EP | 605893 A1 | 7/1994 |
| JP | 2008-533909 A | 8/2008 |
| JP | 2010-507941 A | 3/2010 |
| JP | 2013-534795 A | 9/2013 |
| RU | 2190306 C2 | 9/2002 |
| RU | 2011140810 A | 4/2013 |
| WO | WO 2005/013087 A2 | 2/2005 |
| WO | WO 2006/081253 A2 | 8/2006 |
| WO | WO 2012/121820 A1 | 9/2012 |
| WO | WO 2014/166705 A1 | 10/2014 |

OTHER PUBLICATIONS

Auyeung, Cheung, "Color Gamut Scalable Video Coding with Piecewise Linear Predictions", JCTVC-N0271, 14th Meeting: Vienna, Austria, Jul. 29-Aug. 2, 2013, 3 pages.

Auyeung, Cheung, "Non-SCE4: Picture and Region Adaptive Gain-Offset Prediction for Color Space Scalability", JCTVC-O0195, Joint Collaborative Team on Video Coding of ISO/IEC JTC1/SC29/WG11 and ITU-T SG., Geneva,CH, Oct. 15, 2013.

Balaji et al., "Preprocessing Methods for Improved Lossless Compression of Color Look-Up Tables", Journal of Imaging Science and Technology, Jul. 22, 2008, 9 pages.

Bordes et al., "AHG14: Color Gamut Scalable Video Coding using 3D LUT: New Results", Technicolor, JCTVC-N0168-r1 , 14th Meeting: Vienna, AT, Jul. 25-Aug. 2, 2013, 11 pages.

Bordes et al., "AHG14: Color Gamut Scalable Video Coding using 3D LUT", Technicolor, JCTVC-M0197, 13th Meeting: Incheon, KR, Apr. 18-26, 2013, 10 pages.

Bordes et al., "Color Gamut Scalable Video Coding for SHVC", IEEE, Picture Coding Symposium, Dec. 8, 2013, pp. 301-304.

Bordes et al., "Color Mapping Sei Message", Technicolor, JCTVC-N0180, 14th Meeting: Vienna, AT, Jul. 25-Aug. 2, 2013, 10 pages.

Bordes et al., "Description of HEVC Scalable Extension Core Experiment SCE1: Color Gamut and Bit-Depth Scalability", JCTVC-O1101, Joint Collaborative Team on Video Coding of ISO/IEC JTC1/SC29/WG11 and ITU-T SG., Geneva, CH, Oct. 2013.

Bordes et al., "SCE4: Results on 5.3-Test1 and 5.3-Test2", Technicolor, JCTVC-O0159, 15th Meeting: Geneva, CH, Oct. 23-Nov. 1, 2013, pp. 1-12.

Bross et al., "High Efficiency Video Coding (HEVC) Text Specification Draft 7", JCTVC-I1003, 9th Meeting: Geneva, CH, Apr. 27-May 7, 2012, 280 pages.

Chen et al., "SHVC Draft 3", JCTVC-N1008, 14th Meeting: Vienna, AT, Jul. 25-Aug. 2, 2013, 71 pages.

Guo et al., "Signaling of Phase Offset in Up-sampling Process and Chroma Sampling Location", Qualcomm Incorporated, InterDigital Communications, Inc., Nokia, JCTVC-M0465, 13th Meeting: Incheon, KR, Apr. 18-26, 2013, pp. 1-8.

He et al., "Non-SCE4/AHG14: Combined Bit-Depth and Color Gamut Conversion with 3D LUT for SHVC Color Gamut Scalability", InterDigital Communications, Inc., JCTVC-O0161, 15th Meeting: Geneva, CH, Oct. 23-Nov. 1, 2013, 7 pages.

Husak et al., "Ad Hoc on MPEG Frame Compatible (MFC) Stereo Coding", MPEG, Document No. m24033, May 2012.

ISO/IEC "Information Technology-Coding of Audio-Visual Objects-Part 2:Visual", Reference No. ISO/IEC 14496-2:2001(E), Dec. 1, 2001, 536 pages.

ISO/IEC, "Information Technology-Coding of Moving Pictures and Associated Audio for Digital Storage Media at up to About 1,5 Mbit/s-Part 2: Video", Ref. No. ISO/IEC 11172-2:1993/Cor. 3:2003(E), Nov. 1, 2003, 6 pages.

ISO/IEC, "Information Technology-Generic Coding of Moving Pictures and Associated Audio information: Video", ISO/IEC 13818-2, Dec. 2000.

ISO/IEC, "Joint Call for Proposals on Scalable Video Coding Extensions of High Efficiency Video Coding (HEVC)", N12957, ISO/IEC JTC 1/SC 29/WG 11 and ITU-T SG 16 WP 3, Stockholm, Sweden, Jul. 2012, 11 pages.

ITU, "Series H: Audiovisual and Multimedia Systems Coding of Moving Video-Codec for Audiovisual Services at n × 384 kbit/s", Reedition of CCITT Recommendation H.261 published in the Blue Book, Fascicle III.6, Nov. 1988, 14 pages.

ITU-T, "Series H: Audiovisual and Multimedia Systems Infrastructure of Audiovisual Services-Coding of Moving Video-Advanced Video Coding for Generic Audiovisual Services", ITU-T Recommandation H.264, Nov. 2007, 563 pages.

(56) References Cited

OTHER PUBLICATIONS

ITU-T, "Terms of Reference of the Joint Collaborative Team on 3D Video Coding Extension Development", ITU-T Q6/16 Visual Coding and ISO/IEC JTC1/SC29/WG11, Coding of Moving Pictures and Audio, May 2012, 4 pages.
ITU-T, "Transmission of Non-Telephone Signals-Video Coding for Low Bit Rate Communication", ITU-T Recommendation H.263, Mar. 1996, 52 pages.
ITU-R, "Parameter Values for the HDTV Standards for Production and International Programme Exchange", Recommendation ITU-R BT 709, Dec. 2010.
ITU-R, "Parameter Values for Uhdtv Systems for Production and International Programme Exchange", ITU-R Recommendation BT 2020, Apr. 2012.
Kerofsky et al., "Color Gamut Scalable Video Coding: New Results", Sharp Labs of America, JCTVC-L0334, 12th Meeting: Geneva, CH, Jan. 14-23, 2013, 17 pages.
Li et al., "Non-SCE4: Weighted Prediction Based Color Gamut Scalability", JCTVC-O0180, Joint Collaborative Team on Video Coding of ISO/IEC JTC1/SC29/WG11 and ITU-T SG.16, Geneva, CH, Oct. 15, 2013.
Luthra et al., "Requirements of the Scalable Enhancement of HEVC", ISO/IEC JTC1/SC29/WG11 N12956, Stockholm, Sweden, Jul. 2012, 12 pages.
Luthra et al., "Use Cases of the Scalable Enhancement of HEVC", ISO/IEC JTC1/SC29/WG11 N12955, Stockholm, Sweden, Jul. 2012, 8 pages.
ISO/IEC, "Call for Proposals on 3D Video Coding Technology", Video and Requirement, ISO/IEC JTC1/SC29/WG11MPEG2011/N12036, Geneva, Switzerland, Apr. 2011, 20 pages.
Muller et al., "AHG Report on 3D Video Coding", MPEG Document No. m24033, Geneva, CH, Apr. 2012, 24 pages.
Ohm, Jens-Rainer, "Advances in Scalable Video Coding", Proceedings of the IEEE, vol. 93, No. 1, Jan. 2005, pp. 42-56.
Schwarz et al., "Overview of the Scalable Video Coding Extension of the H.264/AVC Standard", IEEE Transactions on Circuits and Systems for Video Technology, vol. 17, No. 9, Sep. 2007, pp. 1103-1120.
Segall et al., "Description of Core Experiment SCE4: Color Gamut and Bit-Depth Scalability", JCTVC-N1104, 14th Meeting: Vienna, AT, Jul. 25-Aug. 2, 2013, 5 pages.
Segall et al., "SCE4: Summary Report of Color Gamut and Bit Depth Scalability", JCTVC-O0034, Joint Collaborative Team on Video Coding (JCT-VC) of ITU-T SG 16 WP 3 and ISO/IEC JTC 1/SC 29/WG 11, Geneva, CH, Oct. 2013.
Sullivan et al., "Rate-Distortion Optimization for Video Compression", Signal Processing Magazine, IEEE, vol. 15, No. 6, Nov. 1998, pp. 74-90.
Vetro et al., "Overview of the Stereo and Multiview Video Coding Extensions of the H.264/MPEG-4 AVC Standard", Mitsubishi Electric Research Laboratories, Proceedings of IEEE, Jan. 31, 2011, 17 pages.
Wikipedia, "3D Lookup Table", Available at http://en.wikipedia.org/wiki/3D_lookup_table, Retrieved on Jun. 23, 2017, 2 pages.
Wikipedia, "Least Squares", Available at https://en.wikipedia.org/wiki/Least_squares, Retrieved on Jun. 27, 2017, 12 pages.
Wikipedia, "Trilinear Interpolation", Available at https://en.wikipedia.org/wiki/Trilinear_interpolation, Retrived on Jun. 23, 2017, 3 pages.

* cited by examiner

SYSTEMS AND METHODS FOR PROVIDING 3D LOOK-UP TABLE CODING FOR COLOR GAMUT SCALABILITY

CROSS-REFERENCE TO RELATED APPLICATIONS

This application is a continuation application of U.S. Non-Provisional Application No. 15/022,386, filed Mar. 16, 2016, which is the National Stage Entry under 35 U.S.C. § 371of Patent Cooperation Treaty Application No. PCT/US2014/056608, filed Sep. 19, 2014, which claims the benefit of U.S. Provisional Patent Application No. 61/880,715 filed on Sep. 20, 2013, the contents of which are hereby incorporated by reference herein.

BACKGROUND

A three-dimensional (3D) look-up table (LUT) may be generated from a color grading process by a colorist or it may be estimated by an encoder (for example, using an original signal in one color space and the corresponding signal in another color space). The 3D LUT may need to be sent in a bitstream from the encoder to a decoder, such that the decoder may apply a color gamut conversion process (e.g., the same color gamut conversion process) during inter-layer processing.

Signaling overhead of 3D LUT may be significant, because the dimension of the table may be large. For example, a sample bit-depth may be 8 bits and a unit octant size may be 16×16×16 (e.g., the color space may be partitioned to a representation of 16×16×16 octants) and, as such, there may be 17×17×17 entries in the 3D LUT table. Each entry of the 3D LUT may have 3 components. Thus, the total uncompressed table size may be 117,912 (17×17×17×3×8) bits, which may result in significant signaling overhead. With this amount of overhead, 3D LUT may have to be signaled at a sequence level, because, for example, individual pictures may not be able to afford such an overhead. At the sequence level, each of the pictures in a sequence may use the same 3D LUT, which may result in a sub-optimal color gamut conversion and/or may degrade enhancement layer coding efficiency. The colorist may (for artistic production reasons) change the color gamut from picture to picture or from scene to scene, and so picture-level signaling of the 3D LUT may be required for effective color gamut prediction.

SUMMARY

Systems and methods for improving efficiency in three-dimensional (3D) look-up table (LUT) coding and/or reducing table size (e.g. a size in bits of a coded representation) of a 3D LUT may be provided. For example, octants associated with the 3D LUT may be provided for color space segmentation and coding may be performed on an octree associated with the octants. One or more of the octants may be a non-uniform octant. Parameters of an octant may be lossy coded with reduced precision. The 3D LUT may comprise vertices. One or more of the octants may be coarser such that there may be a larger distance between the vertices that may be neighboring.

The octants may further provide hierarchical tree structured 3D data that may be organized in the octree for the coding. At least one of the following may apply: an octree may comprise multiple layers, each node in the octree may represent one of the octants, or each node may be referenced from a root. Further, one or more of the octants may be split at one or more of the layers and/or at least one of the octants may be segmented into sub-octants. A vertex of the vertices in the 3D LUT may belong to and/or correspond to one or more of the nodes that may represent the octants at different layers in the octree. The coding on the octree may be performed, for example, by calling and executing a coding octant function to encode the nodes and the vertices associated therewith in the 3D LUT in a layer-first traversal order. The 3D LUT may also be signaled (e.g., based on a sequence and/or picture level).

DETAILED DESCRIPTION

Video data today may be transmitted over a combination of wired networks and wireless networks, which may further complicate the underlying transmission channel characteristics. In such scenarios, the premise of scalable video coding may provide an attractive solution to improve the quality of experience for video applications running on devices with different capabilities over heterogeneous networks. For example, scalable video coding may encode a signal (e.g., once) at a highest representation such as a temporal resolution, spatial resolution, quality, and/or the like, but may enable decoding from subsets of the video streams depending on the specific rate and/or representation used by certain applications running on a specific client device. Bandwidth and storage may be saved compared to non-scalable solutions. International video standards such as MPEG-2 Video, H.263, MPEG4 Visual and/or H.264 may have tools and/or profiles that support some modes of scalability.

Figure 1:
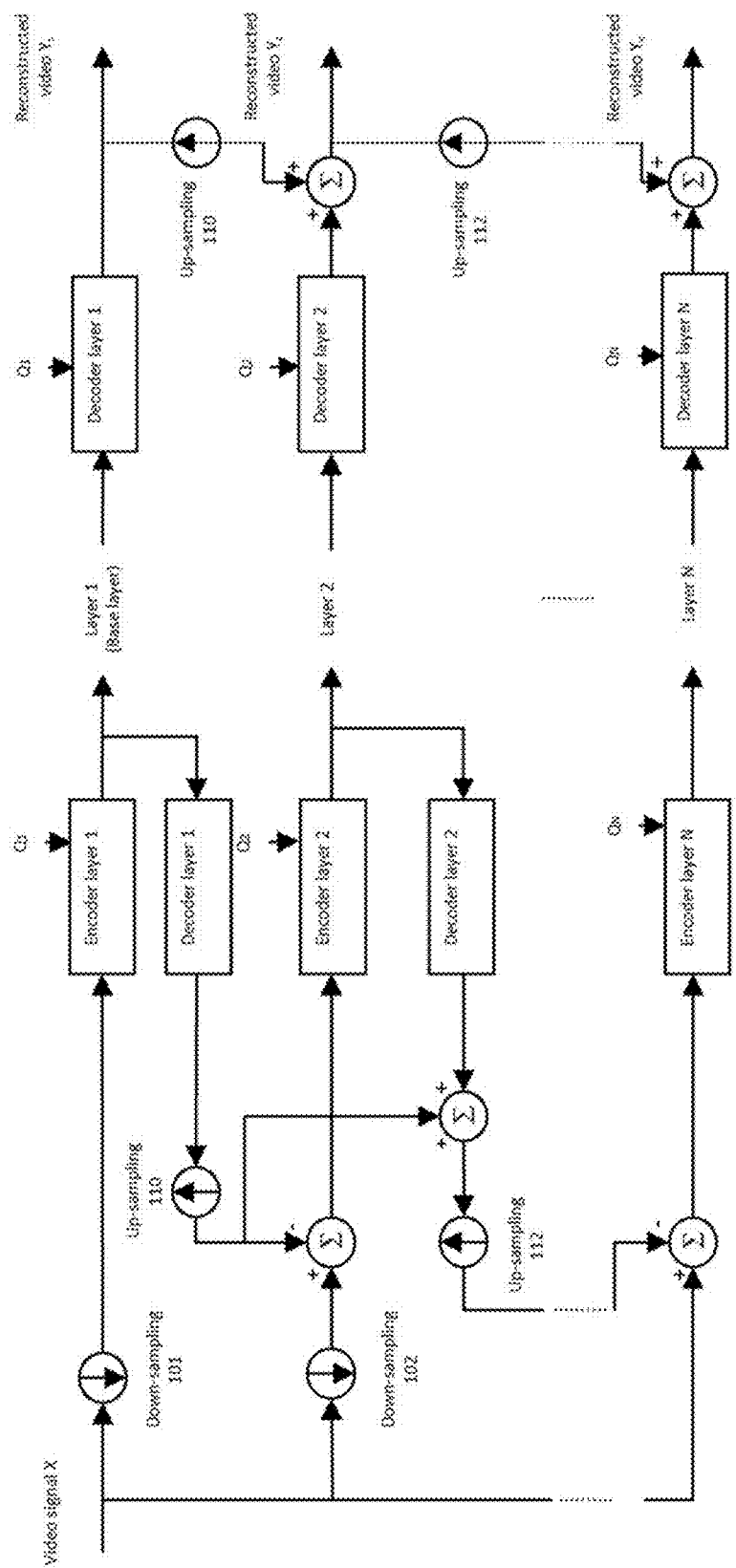
FIG. 1 illustrates a block diagram of a scalable video coding system with one or more layers such as N layers.

FIG. 1 illustrates a block diagram of a simple block-based hybrid scalable video encoding system. The spatial/temporal signal resolution represented by the layer 1 (base layer) may be generated by down-sampling of the input video signal. In a subsequent encoding stage, an appropriate setting of the quantizer (Q1) may lead to a certain quality level of the base information. To more efficiently encode subsequent higher layers, a base-layer reconstruction Y1, which may be an approximation of higher layer resolution levels, may be utilized in the encoding/decoding of the subsequent layers. The up-sampling unit may perform up-sampling of the base layer reconstruction signal to a layer-2's resolution. Down-sampling and up-sampling may be performed throughout the layers (1, 2 . . . N) and/or the downsampling and upsampling ratios may be different depending on the dimension of the scalability between two given layers. In the system of FIG. 1, for a given higher layer n (2≤n≤N), a differential signal may be generated by subtracting an upsampled lower layer signal (e.g., layer n-1 signal) from the current layer n signal. The difference signal thus obtained may be encoded. If the video signals represented by two layers (e.g., n1 and n2) may have the same spatial resolution, the corresponding down-sampling and up-sampling operations may be by-passed. A given layer n (1≤n≤N) or a plurality of layers may be decoded without using decoded information from higher layers. However, relying on coding of a residual signal (i.e., a difference signal between two layers) for each of the layers except the base layer, as provided by the system in FIG. 1, may sometimes cause visual artifacts due to, for example, quantizing and/or normalizing the residual signal to restrict its dynamic range and/or additional quantization performed during coding of the residual. Some or all of the higher layer encoders may adopt motion estimation and motion compensated prediction as an encoding mode. However, motion estimation and compensation in a residual signal may be different from conventional motion estimation and may be prone to visual artifacts. To minimize such visual artifacts, a sophisticated residual quantization as well as joint quantization between, for example, quantizing and/or normalizing the residual signal and the additional quantization performed during coding of the residual may be provided and/or used thereby increasing system complexity.

Scalable Video Coding (SVC) may be an extension of H.264 that may enable the transmission and decoding of partial bit streams to provide video services with lower temporal or spatial resolutions or reduced fidelity while retaining a relative high reconstruction quality given the rate of the partial bit streams. One design feature of SVC may be Single loop decoding. Single loop decoding may refer to the fact that an SVC decoder may set up one motion compensation loop at the layer being decoded, and may not have to set up motion compensation loop(s) at other lower layer(s). For example, the bitstream may include 2 layers such as layer 1 (base layer) and layer 2 (enhancement layer). If the decoder wants to reconstruct layer 2 video, a decoded picture buffer and motion compensated prediction may be set up for layer 2, but not for layer 1 (e.g., the base layer that layer 2 may depend on). Thus, SVC may not need and/or use a reference picture from lower layers to be fully reconstructed, for example, thereby reducing computational complexity and memory requirement at the decoder.

Single loop decoding may be achieved by constrained inter-layer texture prediction where, for a current block in a given layer, spatial texture prediction from a lower layer may be permitted if the corresponding low layer block may be coded in intra mode (this may also be called restricted intra prediction). For example, when the lower layer block may be coded in intra mode, it may be reconstructed without the need for motion compensation operations and decoded picture buffer. To improve rate-distortion efficiency of an enhancement layer, SVC may use additional inter-layer prediction techniques such as motion vector prediction, residual prediction, mode prediction, and/or the like from lower layers. Although the single loop decoding feature of SVC may reduce the computational complexity and memory requirements at the decoder, it may increase implementation complexity by relying heavily on block-level inter-layer prediction methods to achieve satisfactory performance. Furthermore, to compensate for the performance penalty incurred by imposing the single loop decoding constraint, encoder design and computation complexity may be increased such that desired performance may be achieved. Coding of interlaced content may not be well supported by SVC, which may affect its adoption by the broadcasting industry. Consequently, complications in SVC encoder and decoder design and system implementation may cause limited SVC adoptions in the market place.

Figure 2:
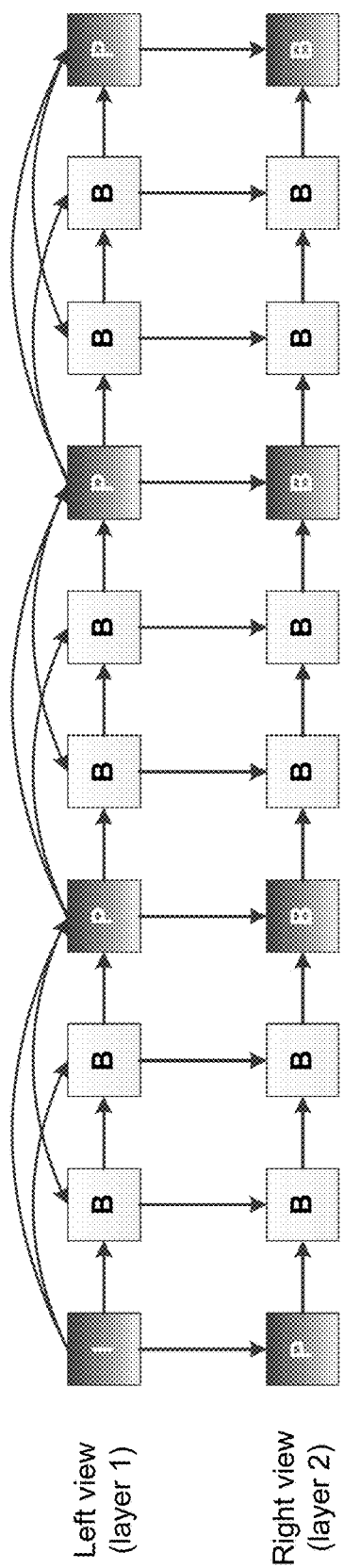
FIG. 2 illustrates a temporal and/or inter-layer prediction for stereoscopic (e.g., 2-view) video coding using Multi-view Video Coding (MVC).

Multi-view Video Coding (MVC) may be another extension of H.264 that may provide view scalability. In view scalability, the base layer bitstream may be decoded to reconstruct a conventional 2D video, and additional enhancement layers may be decoded to reconstruct other view representations of the same video signal. When views may be combined together and displayed by a proper 3D display, the user may experience 3D video with proper depth perception. FIG. 2 may provide an example prediction structure of using MVC to code a stereoscopic video with a left view (layer 1) and a right view (layer 2 ). The left view video in 0 may be coded with an IBBP prediction structure. The right view video may be coded with a PBBB prediction structure. In the right view, a first picture collocated with the first I picture in the left view may be coded as a P picture. The other pictures in the right view may be coded as B pictures with the first prediction coming from temporal references in the right view and the second prediction coming from inter-layer reference in the left view.

Stereoscopic 3D TVs, which may use 3D glasses, may be used for enjoying 3D content (e.g., movies, live sports, and/or the like) at home. Unlike SVC, MVC may not support the single loop decoding feature. As shown in FIG. 2, decoding of the right view (layer 2 ) video may need the pictures (e.g., all or the entire pictures) in the left view (layer 1) to be available such that motion compensation loops may be supported in both views/layers. However, MVC may have a design advantage in that it may include a high level syntax changes, and may not include block-level changes to H.264/AVC. This may lead to an easier implementation as the underlying MVC encoder/decoder logics may remain the same, may be easily duplicated, and/or reference pictures at slice/picture level may need to be correctly configured to enable MVC. This, coupled with an explosion of 3D video content (e.g., primarily 3D movie production and 3D live sports broadcasting) in recent years, may enable or allow MVC to enjoy much wider commercial success compared to SVC. MVC may also support coding of more than two views by extending the example in 0 to perform inter-layer prediction across multiple views.

In 3D video coding, for example, MPEG Frame Compatible (MFC) coding may also be provided and/or used. For example, as described herein, 3D content may be stereoscopic 3D video that may include two views such as the left and the right view. Stereoscopic 3D content delivery may be achieved by packing/multiplexing the two views into one frame (hence the name, frame compatible) and/or compressing and transmitting the packed video with existing standard such as H.264/AVC. At the receiver side, after decoding, the frames may be unpacked and displayed as two views. Such multiplexing of the views may be done in the temporal domain or spatial domain. The two views may be spatially downsampled by a factor of two and packed by various arrangements (e.g., when done in the spatial domain to maintain the same picture size). For example, side-by-side arrangement may put the downsampled left view on the left half of the picture and the downsampled right view on the right half of the picture. Other arrangements may include top-and-bottom, line-by-line, checkerboard, and/or the like. The specific arrangement that may be used to achieve frame compatible 3D video may be conveyed by frame packing arrangement aupplemental enhancement information (SEI) messages. Although such an arrangement may achieve 3D delivery with minimal increase in bandwidth requirement (e.g., there may still be some increase since the packed frames may be more difficult to compress), spatial downsampling may cause aliasing in the views and reduce the visual quality and user experience of 3D video. Thus, MFC development may focus on providing a scalable extension to frame compatible (i.e., two views packed into the same frame) base layer video and/or providing one or more enhancement layers to recover the resolution views, for example, for an improved 3D experience. As such, though geared toward offering 3D video delivery, the primary underlying technology to enabling full-resolution MFC may be related closely (e.g., more closely) to spatial scalability technologies.

Requirements and/or use cases for scalable enhancements of HEVC may be provided, produced, and/or used. Additionally, one or more targets may have been established, for example, for spatial scalability. Compared to using non-scalable coding, measured for higher resolution video, the targets of 25% bit rate reduction for 2x spatial scalability and 50% bit rate reduction for 1.5x spatial scalability may be achieved. To broaden the use cases for scalable HEVC, the so-called scalability may be used. Standards scalability may refer to the type of scalability when the base layer may be encoded with an earlier standard such as H.264/AVC, or even MPEG2, while the one or more enhancement layers may be encoded using a more recent standard such as the HEVC standard. Standards scalability may be aimed at providing backward compatibility for legacy content that may already be encoded using previous standards and enhancing the quality of the legacy content with one or more enhancement layers encoded with upcoming standards like HEVC that may provide better coding efficiency.

Another 3D scalable video coding technique, called 3D video coding or 3DV, may also be provided and/or used. 3DV's primary task may be to develop various flavors of view scalability targeted for autostereoscopic applications. Autostereoscopic displays and applications may allow or enable people to experience 3D without the cumbersome glasses. To achieve a suitable or good 3D experience without glasses, more than two views may be provided and/or used. Coding many views (e.g., such as 9 views or 10 views) may be expensive. Therefore, 3DV may provide and/or use a hybrid approach of coding a few views (e.g., 2 or 3 views) with relatively large disparity together with the depth maps that may provide depth information of the views. At the display side, the coded views and depth maps may be decoded, and the remaining views may be generated using the decoded views and their depth maps using view synthesis technologies. 3DV may consider various methods to code the views and the depth maps, for example, coding them using a combination of different standards such as H.264/AVC, MVC and HEVC including coding the base layer with one standard (e.g., H.264/AVC) and coding one or more enhancement layers with another standard (e.g., HEVC). 3DV may provide a menu of different options for applications to choose from.

Table 1 summarizes different types of scalabilities discussed herein. At the bottom of Table 1, bit-depth scalability and chroma format scalability may be tied to video formats (e.g., higher than 8-bit video, and chroma sampling formats higher than YUV4:2:0) primarily used by professional video applications.

Figure 3:
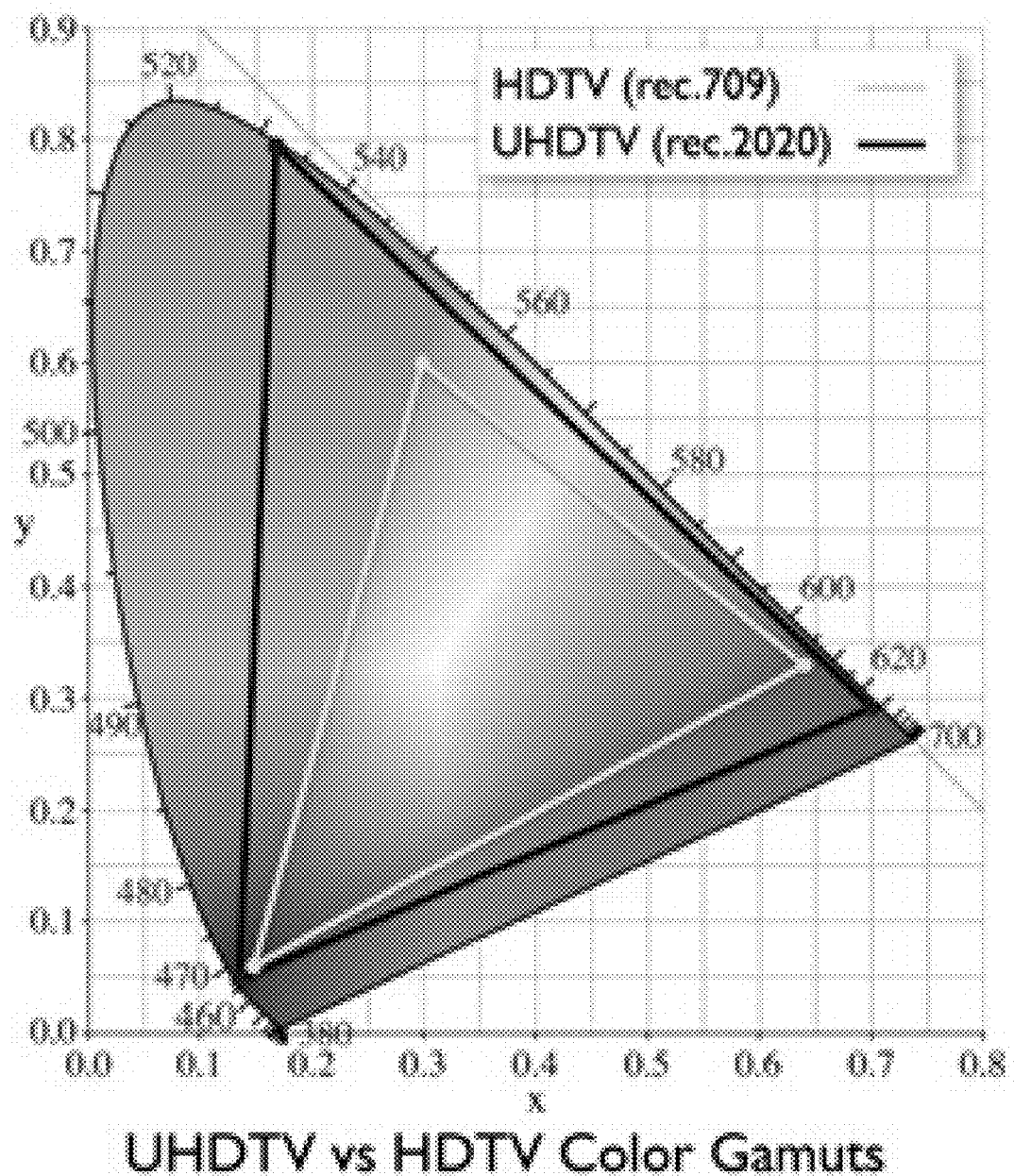
FIG. 3 illustrates a color primary comparison between a BT.709 (HDTV) and a BT.2020 (UHDTV) in a CIE color definition.

With advanced display technologies, Ultra high definition TV (UHDTV) that may be specified in ITU BT.2020 may support larger resolution, larger bit-depth, higher frame-rate, and wider color gamut compared to the HDTV specification (BT.709). With such a technique, the user experience may be greatly improved due to the high fidelity quality that BT.2020 may provide. UHDTV may support up to 4K (3840×2160) and 8K (7680×4320) resolution, with the frame-rate being up to 120 Hz, and the bit-depth of picture samples being 10 bits or 12 bits. The color space of UHDTV may be defined by BT.2020. FIG. 3 illustrates a comparison between BT.709 (HDTV) and BT.2020 (UHDTV) in a CIE color definition. The volume of colors rendered in BT.2020 may be broader than that in BT.709, which may mean more visible color information may be rendered using the UHDTV specification.

TABLE 1

Different types of scalabilities

| Scalability | Example | Standards |
|---|---|---|
| View scalability | 2D→3D (2 or more views) | MVC, MFC, 3DV |
| Spatial scalability | 720p→1080p | SVC, scalable HEVC |
| Quality (SNR) scalability | 35 dB→38 dB | SVC, scalable HEVC |
| Temporal scalability | 30 fps→60 fps | H.264/AVC, SVC, scalable HEVC |
| Standards scalability | H.264/AVC→HEVC | 3DV, scalable HEVC |
| Bit-depth scalability | 8-bit video → 10-bit video | Scalable HEVC* |
| Chroma format scalability | YUV4:2:0→YUV4:2:2, YUV4:4:4 | Scalable HEVC* |
| Aspect ratio scalability | 4:3→16:9 | Scalable HEVC* |
| Color gamut scalability | BT.709(HDTV) -> BT.2020(UHDTV) | Scalable HEVC* |

Figure 4A:
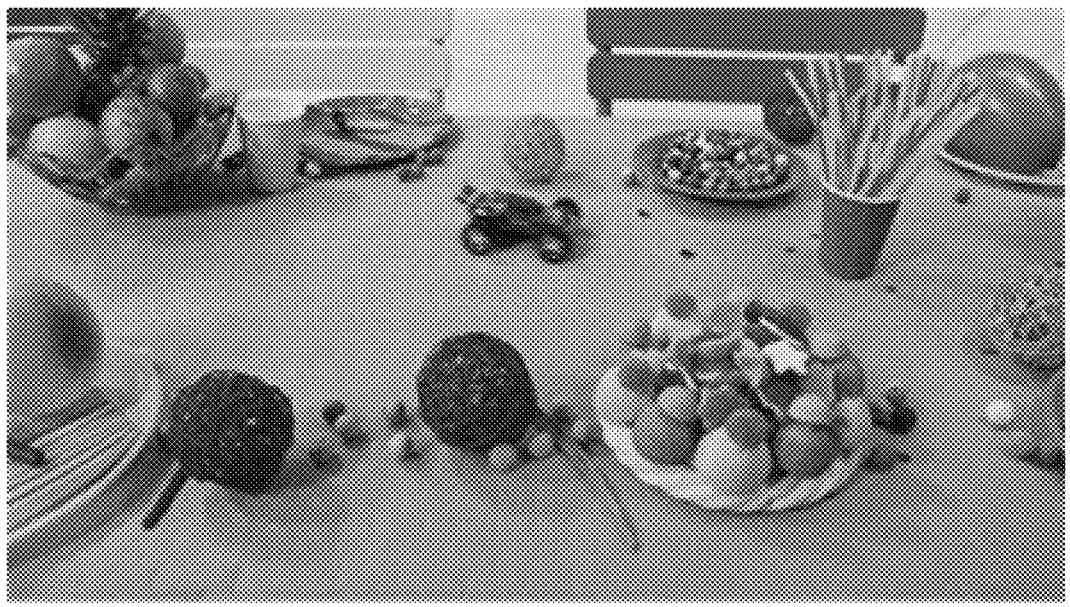
FIGS. 4A-4B illustrate a visual difference to an end user between a BT.709 color gamut and a P3 color gamut, respectively.
Figure 4B:
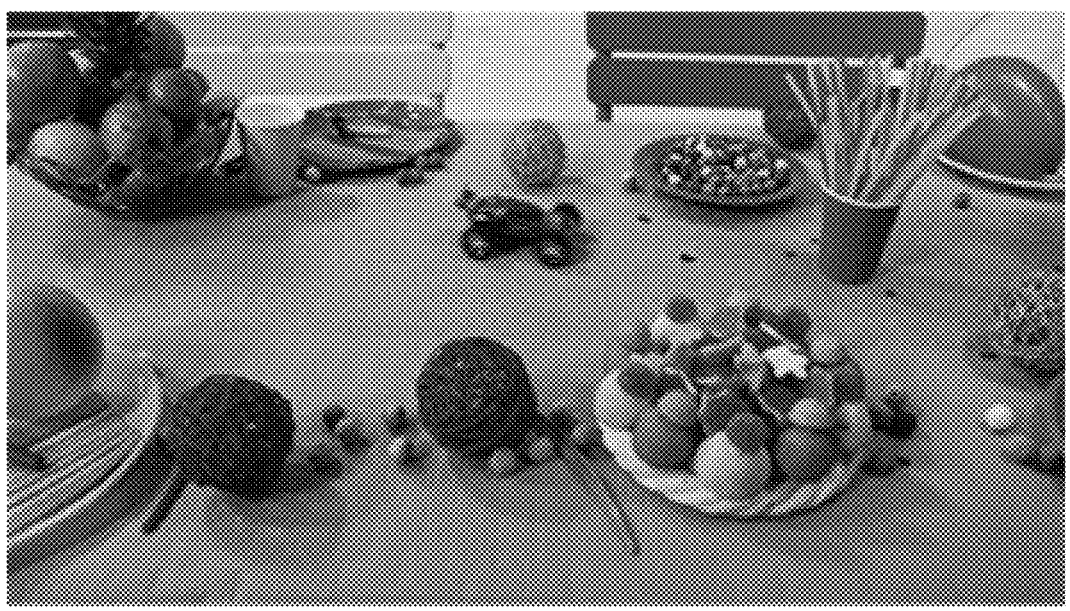

One type of scalability that may be provided and/or used may be color gamut scalability. Color gamut scalable (CGS) coding may be multi-layer coding where two or more layers may have different color gamut and bit-depth. For example, as shown in Table 1, in a 2-layer scalable system, the base layer may be a HDTV color gamut as defined in BT.709 and the enhancement layer may be a UHDTV color gamut as defined in BT.2020. Another color gamut that may be used may be a P3 color gamut. The P3 color gamut may be used in digital cinema applications. The inter-layer process in CGS coding may use color gamut conversion methods to convert a base layer color gamut to an enhancement layer color gamut. After color gamut conversion may be applied, the inter-layer reference pictures generated may be used to predict the enhancement layer pictures, for example, with better or improved accuracy. FIGS. 4A-4B depict an example of a visual difference to the end users between the BT.709 color gamut and the P3 color gamut respectively. In FIGS. 4A-4B, the same content may be color graded twice using a different color gamut. For example, the content in FIG. 4A may be color graded in BT.709 and rendered/displayed on a BT.709 display, and the content in FIG. 4B may be color graded in P3 and rendered/displayed on BT.709 display. As shown, there is a noticeable color difference between the two images.

Figure 5:
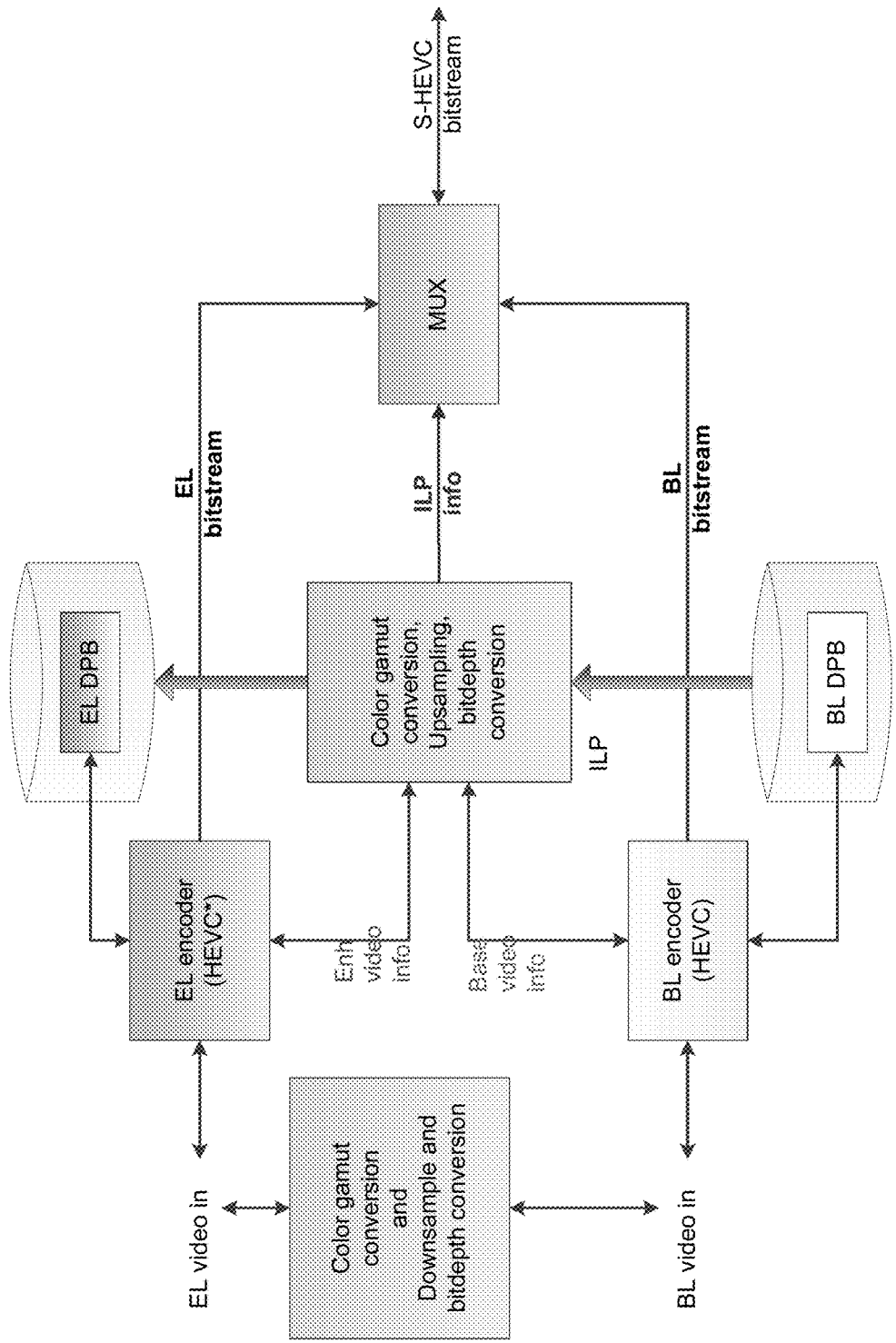
FIG. 5 depicts a color gamut scalability (CGS) coding with picture level inter-layer prediction (ILP).

If, for example, FIG. 4A is coded in the base layer and FIG. 4B is coded in the enhancement layer, for example, using the CGS coding system in FIG. 5, additional inter-layer processing may be provided and/or used to improve the enhancement layer coding efficiency. Color gamut conversion methods may also be used in inter-layer processing for CGS. Through the use of color gamut conversion methods, the colors in BT.709 space may be translated into the P3 space and may be used to more effectively predict enhancement layer signal in the P3 space.

The model parameters for color gamut conversion may be different for different content even when the BL color gamut and the EL color gamut may be fixed (e.g., BL may be in 709 and may be EL in 2020). These parameters may depend on the color grading process during post production in content generation where the colorist(s) may apply different grading parameters to different spaces and to different content to reflect his or her or their artistic intent. Moreover, the input video for color grading may include high fidelity pictures. In a scalable coding system, coding of the BL pictures may introduce quantization noise. With coding structures such as the hierarchical prediction structure, the level of quantization may be adjusted per picture or per group of pictures. Therefore, the model parameters generated from color grading may not be sufficiently accurate for coding purposes. It may be more effective for the encoder to compensate the coding noise by estimating the model parameters on the fly. The encoder may estimate these parameters per picture or per groups of pictures. These model parameters, for example, generated during color grading process and/or by the encoder may be signaled to decoder at the sequence and/or picture level so the decoder may perform the same color gamut conversion process during inter-layer prediction.

There may be various color gamut conversion methods such as linear or piece-wise linear. In the film industry, a 3D Look-up Table (3D LUT) may be used for color gamut conversion from one color gamut method or technique to another. Additionally, 3D LUT for CGS coding may be provided and/or used. FIG. 5 depicts an example CGS coding scheme with picture level inter-layer prediction (ILP). The ILP includes color gamut conversion from base layer (BL) color gamut to enhancement layer (EL) color gamut, upsampling from BL spatial resolution to EL spatial resolution, and/or inverse tone mapping (e.g., conversion of sample bit depth) from BL sample bit-depth to EL sample bit-depth.

Figure 6:
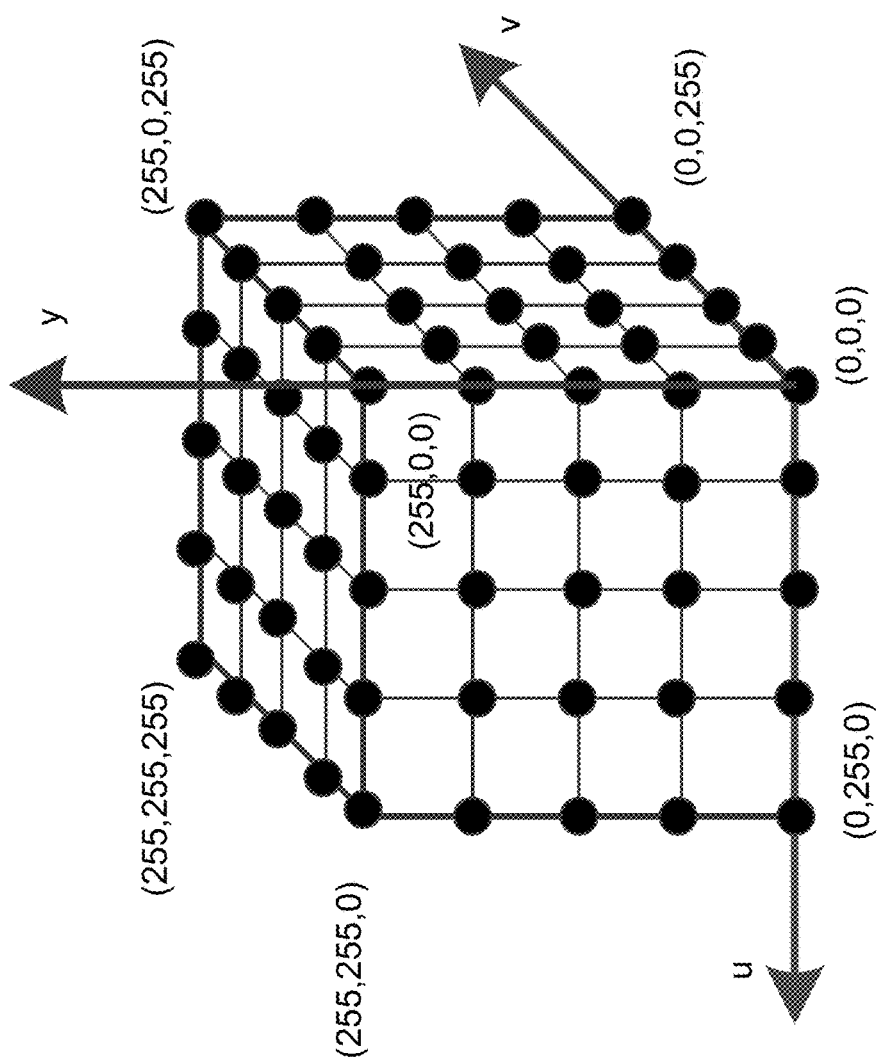
FIG. 6 illustrates a 3D look-up table for an 8-bit YUV signal.
Figure 7:
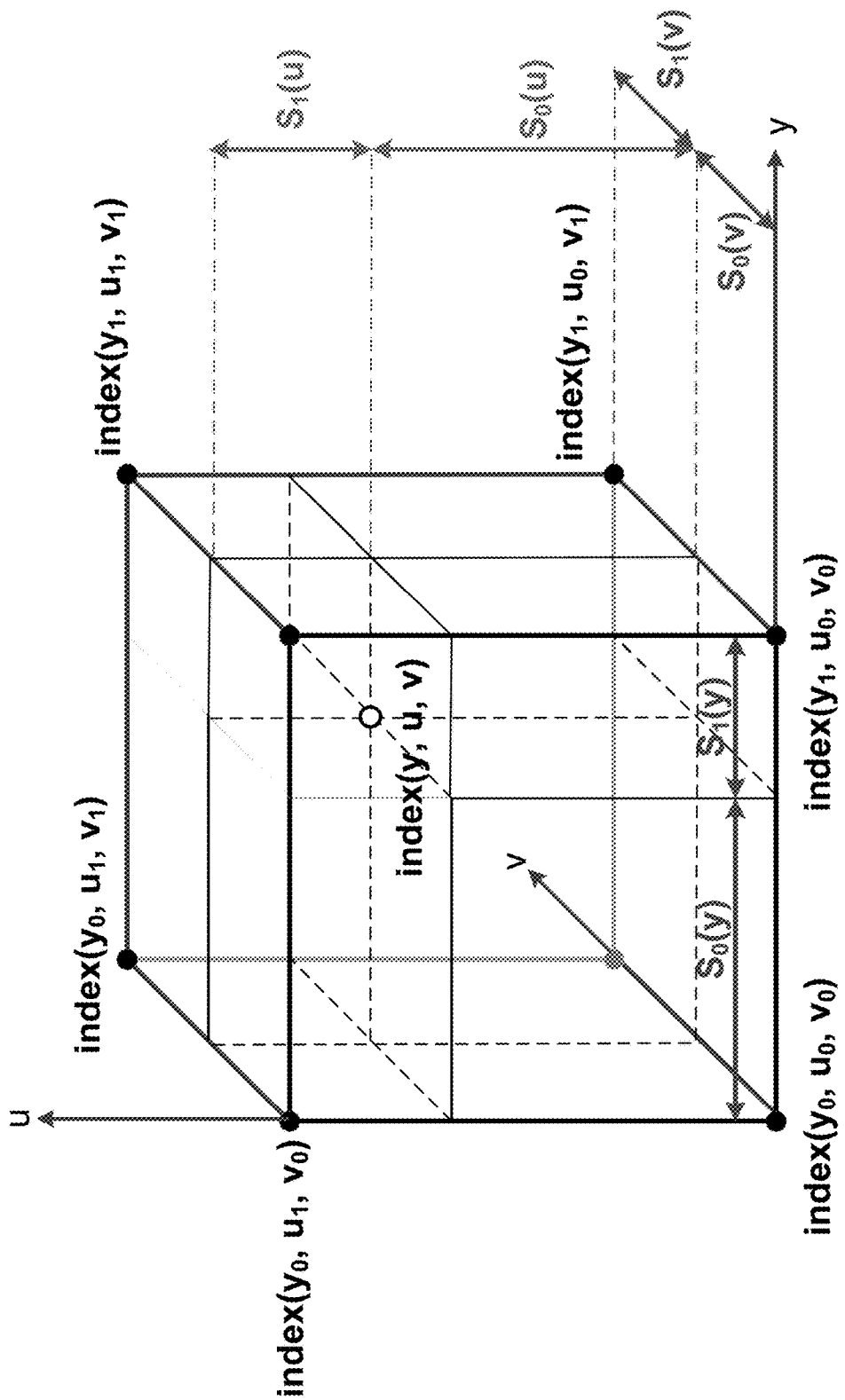
FIG. 7 illustrates a tri-linear 3D LUT.

As described herein, 3D LUT may be used for a color gamut conversion. For example, (y, u, v) may be denoted as the sample triplet in the color gamut of the base layer, and (Y, U, V) as the triplet in EL color gamut. In 3D LUT, the range of BL color space may be segmented into equal octants as shown in FIG. 6. The input of the 3D LUT may be (y, u, v) in the BL color gamut and the output of 3D LUT may be the mapped triplet (Y, U, V) in EL color gamut. During a conversion process, if the input (y, u, v) may overlap with one of the vertices of octants, the output (Y, U, V) maybe be derived by referencing one of the 3D LUT entries directly. Otherwise, if the input (y, u, v) may lie inside an octant (e.g., but not on one of its vertices), trilinear-interpolation as shown in FIG. 7 may be applied with its nearest 8 vertices. The trilinear-interpolation may be carried out using one or more of the following equations:

$$Y = K \times \sum_{i=0,1} \sum_{j=0,1} \sum_{k=0,1} s_i(y) \times s_j(u) \times s_k(v) \times LUT[y_i][u_j][v_k] \cdot y$$

$$U = K \times \sum_{i=0,1} \sum_{j=0,1} \sum_{k=0,1} s_i(y) \times s_j(u) \times s_k(v) \times LUT[y_i][u_j][v_k] \cdot u$$

$$V = K \times \sum_{i=0,1} \sum_{j=0,1} \sum_{k=0,1} s_i(y) \times s_j(u) \times s_k(v) \times LUT[y_i][u_j][v_k] \cdot v$$

$$K = \frac{1}{(y_1 - y_0) \times (u_1 - u_0) \times (v_1 - v_0)}$$

where $(y_i, u_j, v_k)$ may represent the vertices of the BL color gamut (i.e., inputs to 3D LUT), $LUT[y_i][u_j][v_k]$ may represent the vertices of the EL color gamut (i.e., outputs of 3D LUT at the entry $(y_i, u_j, v_k)$), and $s_0(y)=y_1-y$, $s_1(y)=y-y_0$, $s_0(u)=u_1-u$, $s_1(u)=u-u_0$, $s_0(v)=v_1-v$, $s_1(v)=v-v_0$.

As described herein, 3D LUT may be be generated from the color grading process by the colorists, or it may be estimated by the encoder—for example, using original signal in one color space and the corresponding signal in another color space. 3D LUT may be sent in the bitstream from the encoder to the decoder such that the decoder may apply the same color gamut conversion process during inter-layer processing. The signaling overhead of 3D LUT may be increased, large, or high (e.g., significant), because the dimension of the table may be large. For example, as shown in FIG. 6, a sample bit-depth may be 8 bits. If the unit octant size may be 16×16×16, there may be 17×17×17 entries in the 3D LUT table. Each entry of the 3D LUT may also include three components. Thus, the total uncompressed table size may be 117912 (17×17×17×3×8) bits. With this amount of overhead, 3D LUT may be (e.g., only) signaled at sequence level, because individual pictures may not afford such large overhead. Pictures in the sequence may use the same 3D LUT, which may result in sub-optimal color gamut conversion and may degrade enhancement layer coding efficiency.

As such, systems and/or methods may be provided to improve 3D LUT coding. For example, a table size of 3D LUT may be reduced if a non-uniform octant may be used for color space segmentation. For some color regions, the octant may be coarser (e.g., there may be a larger distance between neighboring vertices) to reduce the number of entries in the 3D LUT table.

Figure 8:
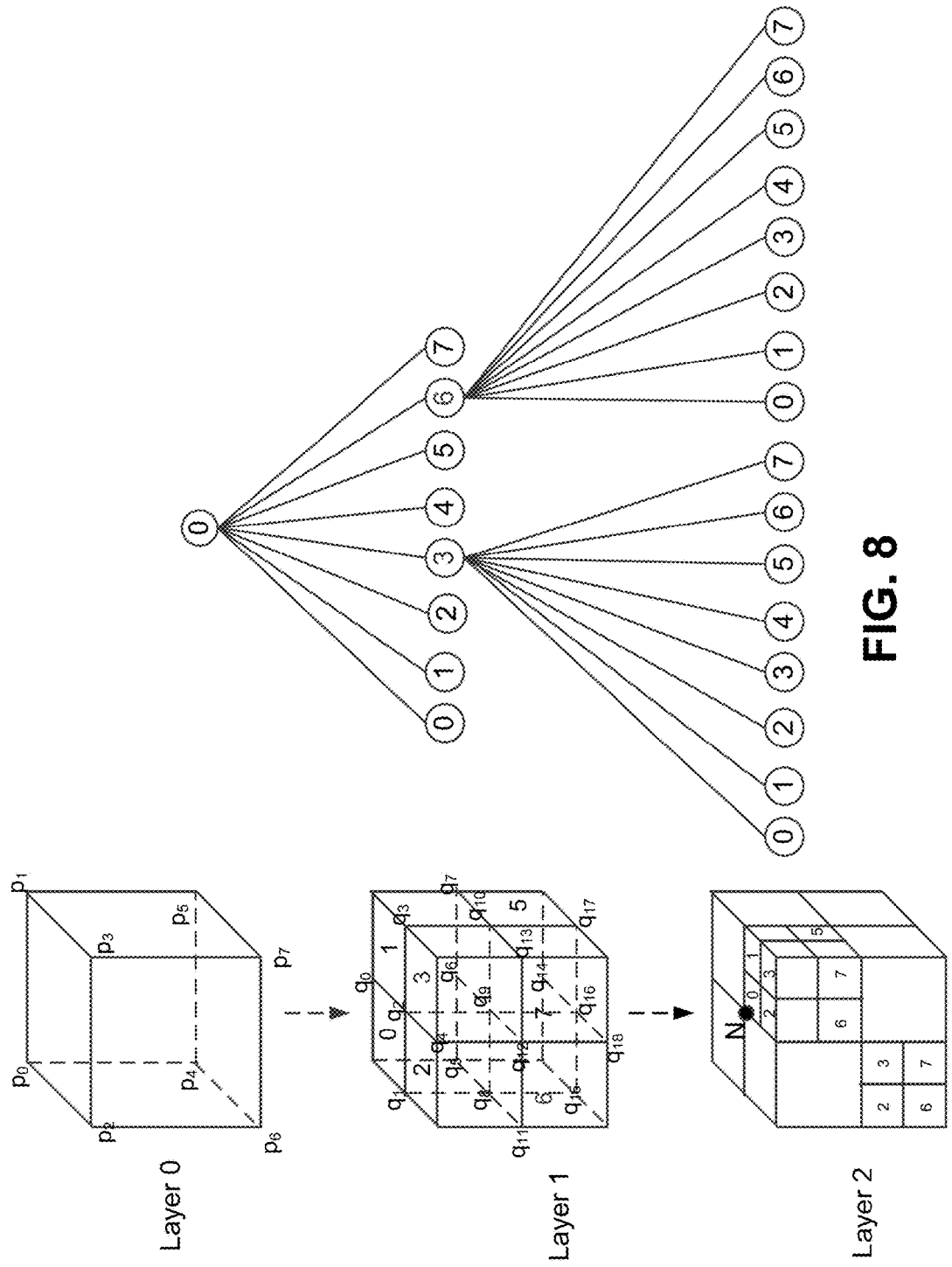
FIG. 8 illustrates an octree for 3D LUT coding.

For this kind of hierarchical tree structured three dimensional data, an octree may be provided and/or used for efficient coding. As shown in FIG. 8, there may be three layers and the octants 3 and 6 at layer 1 may be split. Each node in an octree may represent one octant and each node may be referenced from the root. For example, the octant 0 at layer 2 belonging to octant 3 at layer 1 may be be referenced as "0-3-0" from the root node where "-" may be used as layer delimiter. An octant may be segmented into 8 sub-octants if it may be split further. Leaf octants in the octree may be encoded for the example in FIG. 8 including the layer-2 nodes and some layer-1 nodes (e.g., except 3 and 6 that may be further split). One vertex in the 3D LUT may belong to multiple nodes at different layers. For example, vertex N in FIG. 8 may belong to node 0-0, 0-1, 0-2, 0-3, and 0-3-0. When coding the 3D LUT using octree, this overlapping relationship may be considered to avoid unnecessary signaling of the vertices (e.g., each vertex may be coded once) and may be used to provide efficient 3D LUT as described herein.

Table 2 lists syntax elements for 3D LUT coding. The function coding_octant( ) in Table 2 may be recursively called to encode vertices in the 3D LUT, in a layer-first traversal order, as described, for example, in the context of Table 3. The functions u(n), ue(v) and se(v) may be defined as: u(n): unsigned integer using n bits, ue(v): unsigned integer 0-th order Exp-Golomb coded, and/or se(v): signed integer 0-th order Exp-Golomb coded.

TABLE 2

Syntax of the 3D LUT coding

| | Descriptor |
|---|---|
| 3D_LUT ( ) { | |
|    num_layers_minus1 | u(3) |
|    prediction_mode | u(2) |
|    LUT_precision_luma_minus1 | ue(v) |
|    LUT_precision_chroma_minus1 | ue(v) |
|    coding_octant(0, 0,0,0) | |
| } | |

The num_layers_minus1:(num_layers_minus1+1) may be used to calculate the number of layers octree has. It may be 2 for the octree example in FIG. 8.

The prediction_mode may include three possible prediction modes for the octree coding. When the prediction_mode may be 0, the parent octant from the current 3D LUT may be used as the prediction to code each of its child octants. The prediction value for each child octant/vertex may be generated from its parent octant with trilinear interpolation. This prediction mode may be further discussed in the context of Table 3. When the prediction_mode may be 1, the existing global 3D LUT (e.g., as defined herein below) may be used as prediction to code the current 3D LUT and the prediction for each vertex may be generated from the collocated vertex in the existing global 3D LUT (e.g., the collocated vertex may be interpolated, if not existing). When the prediction_mode may be 2, both the current 3D LUT and the existing global 3D LUT may be used as predictions and the prediction used for each octant/vertex coding may be signaled for each octant/vertex separately.

LUT_precision_luma_minus1 may be provided and/or used. LUT_precision_luma_minus1+1) may be a precision parameter used to code the difference between the LUT parameter to be coded and its prediction for the luma (Y) component.

LUT_precision_chroma_minus1 may be provided and/or used. The LUT_precision_chroma_minus1+1 may be the precision parameter used to code the difference between the LUT parameter and its prediction for the chroma (U, V) component. The precision parameter may be different from that for luma signal.

As discussed herein, LUT_precision_luma_minus1 and LUT_precision_chroma_minus1 may be used for a LUT parameter decoding process. Smaller values of these precision parameters may make 3D LUT more accurate and reduce the distortion of color gamut conversion. Additionally, smaller values may increase the number of coding bits. Therefore, the appropriate values of these precision parameters may be determined by rate-distortion optimization (RDO) process.

Table 3 lists example syntax elements for octree coding in layer-first traversal order. An example of the layer-first traversal order coding may be shown in FIG. 8. For example, the 3D LUT may be shown in two representations in FIG. 8. For example, on the left side, the 3D LUT may be shown in a beginning octant being recursively partitioned into smaller octants, with each octant having 8 vertices. On the right side, the corresponding octree representation of the 3D LUT may be shown. Each node in the octree on the right may correspond to one octant (or equivalently, 8 vertices) on the left. To code each octant (or each octree node), the 8 representing vertices may be coded. This may be reflected by the "for" loop of "for (i=0; i<8; i++)" in Table 3. In FIG. 8, the beginning octant in layer 0 may be coded in the form of the 8 vertices labeled "px", followed by coding of the 8 octants in layer 1, each of which has 8 vertices of their own. Nineteen of these vertices in layer 1 may be unique (e.g., they may be labeled as "qx") and need to be coded. This may be a difference between the syntax in Table 3 and other syntaxes. After octants in layer 1 may be coded, octants 3 and 6 in layer 1 may be split again into 8 child octants each in layer 2.

As shown, the proposed signaling may be a flag when a given vertex has been coded and may avoid sending the vertex repeatedly in the situation when the vertex may be shared by more than one node in the octree. In the example of FIG. 8, this may reduce the number of vertices to be coded in layer 1 from 64 (8×8) to 19. Additionally, when the prediction_mode is 2, the proposed method may signal the prediction method (e.g., a collocated vertex in an existing 3D LUT or the parent vertex of the current 3D LUT) for each vertex.

TABLE 3

Syntax elements for coding_octant( )

| | Descriptor |
|---|---|
| coding_octant ( layer, y,u,v){ | |
|   for( i = 0; i<8 ; i++ ) { | |
|     n = getVertex(y, u, v, i) | |
|     if (!coded_flag[n]) { | |
|       if (prediction_mode == 2) | |
|         vertex_prediction_mode | u(1) |
|       nonzero_residual_flag | u(1) |
|       if (nonzero_residual_flag ) { | |
|         deltaY | se(v) |
|         deltaU | se(v) |
|         deltaV | se(v) |
|       } | |
|       coded_flag[n] = true | |
|     } | |
|   } | |
|   octant_split_flag | u(1) |
|   if (octant_split_flag ) { | |
|     for( i = 0, i<8 ; i++ ) { | |
|       coding_octant ( layer+1, | |
|       y+dy[i],u+du[i],v+dv[i]) | |
|     } | |
|   } | |
| } | |

As shown, a vertex_prediction_mode may be provided and/or used where a 0 may refer to using the parent octant of the current 3D LUT to predict the current vertex and/or a 1 may refer to using the collocated octant of the existing global 3D LUT to predict the current vertex. If prediction_mode may not be equal to 2, the vertex_prediction_mode may be set to be equal to the prediction_mode.

A parent octant in the current 3D LUT may be used to predict the current vertex (e.g., when the vertex prediction mode may be set to 0). As previously explained, since layer-first traversal order may be used, the parent octant at layer (1) may be coded before the child octant at layer (1+1). In the example of FIG. 8, the 8 vertices px at layer 0 may be coded first. When coding one of the 19 vertices qx, a predictor may be formed first using tri-linear interpolation from the 8 vertices px at layer 0. Instead of coding the vertex qx directly, the difference between qx and its predictor may be coded to reduce bit overhead.

A nonzero_residual_flag may be provided and/or used where, for example, a 1 may indicate that there may be nonzero residual to be coded; 0 may indicate that residuals may be zero; and/or the decoded value may be equal to its prediction.

A deltaY or the delta of luma component may be encoded. The deltaY may be calculated as follows:

$$\text{delta}Y = (Y - \text{prediction}\_Y + ((\text{LUT\_precision\_luma\_minus1}+1) \gg 1))/(\text{LUT\_precision\_luma\_minus1}+1). \quad (1)$$

The LUT parameter of the luma component may be reconstructed at a decoder as $$Y = \text{prediction}\_Y + \text{delta}Y \times (\text{LUT\_precision\_luma\_minus1}+1). \quad (2)$$

If (LUT_precision_luma_minus1+1) may be a power of 2, the division in Equation (1) may be substituted by right shifting log 2(LUT_precision_luma_minus1+1) bits and/or the multiplication in Equation (2) may be substituted by left shifting log 2(LUT_precision_luma_minus1+1) bits. Since a left/right shift may be easy to implement in hardware, a color gamut scalable coding system may find it beneficial to enforce (LUT_precision_luma_minus1+1) to be a power of 2. In such a case, the syntax element in Table 2 may be changed to represent the value of log 2(LUT_precision_luma_minus1+1) instead.

A deltaU or the delta of chromaU component may be encoded and, for example, calculated as follows:

$$\text{delta}U = (U - \text{prediction}\_U + ((\text{LUT\_precision\_chroma\_minus1}+1) \gg 1))/(\text{LUT\_precision\_chroma\_minus1}+1). \quad (3)$$

The LUT parameter of the chroma U component may be reconstructed at decoder as $$U = \text{prediction}\_U + \text{delta}U \times (\text{LUT\_precision\_chroma\_minus1}+1). \quad (4)$$

A deltaV or the delta of chromaV component may be encoded. The delta V may be calculated as follows:

$$\text{delta}V = (V - \text{prediction}\_V + ((\text{LUT\_precision\_chroma\_minus1}+1) \gg 1))/(\text{LUT\_precision\_chroma\_minus1}+1). \quad (5)$$

The LUT parameter of the chroma V component may be reconstructed at a decoder as $$V = \text{prediction}\_V + \text{delta}V \times (\text{LUT\_precision\_chroma\_minus1}+1). \quad (6)$$

Similar to the luma component, a color gamut scalable coding system may find it beneficial to enforce (LUT_precision_chroma_minus1+1) to be power of 2 such that left/right shifts may be used in place of multiplication and division.

If (LUT_precision_luma_minus1+1) or (LUT_precision_chroma_minus1+1) may not be a power of 2, the division may be approximated by the combination of multiplication and shifting instead of applying division directly, because divisors may be costly to implement in hardware implementation such as ASIC. For example, the Equations (1)(3)(5) may be implemented as (7)(8)(9):

$$\text{delta}Y = ((Y - \text{prediction}\_Y)*\text{LUT\_precision\_luma\_scale} + (1 \ll (\text{LUT\_precision\_luma\_shift}-1))) \gg \text{LUT\_precision\_luma\_shift} \quad (7)$$

$$\text{delta}U = ((U - \text{prediction}\_U)*\text{LUT\_precision\_chroma\_scale} + (\ll (\text{LUT\_precision\_chroma\_shift}-1))) \gg \text{LUT\_precision\_chroma\_shift} \quad (8)$$

$$\text{delta}V = ((V - \text{prediction}\_V)*\text{LUT\_precision\_chroma\_scale} + (1 \ll (\text{LUT\_precision\_chroma\_shift}-1))) \gg \text{LUT\_precision\_chroma\_shift} \quad (9)$$

where (LUT_precision_luma_minus1+1) and (LUT_precision_chroma_minus1+1) may be calculated as:

$$(\text{LUT\_precision\_luma\_minus1}+1) = (1 \ll \text{LUT\_precision\_luma\_shift})/\text{LUT\_precision\_luma\_scale} \quad (10)$$

$$(\text{LUT\_precision\_chroma\_minus1}+1) = (1 \ll \text{LUT\_precision\_chroma\_shift})/\text{LUT\_precision\_chroma\_scale}. \quad (11)$$

DeltaY may be calculated as LUT_precision_luma_minus1 may be 0. DeltaU and deltaV may be calculated as LUT_precision_chroma_minus1 may be 0.

Further, prediction_Y, prediction_U and prediction_V may be the prediction of one or more LUT parameters. They may be derived according to prediction_mode. If prediction_mode may be 0, the prediction may be a trilinear interpolation from upper layer of current vertex. For example, if current encoding vertex may be vertex V in FIG. 9B, its prediction may be trilinear interpolated be from 8 vertices of the octant 3 at layer 1. If prediction_mode may be 1, then prediction may be equal to collocated vertex in global LUT.

An octant_split_flag may be provided and/or used where, for example, a 1 may indicate that the current octant may be split further and 8 child octants will be coded. An Octant_split_flag that may be equal to 0 may indicate that current octant may be a leaf octant.

The values of dy[i], du[i] and dv[i] in Table 3 may be defined in Table 4.

TABLE 4

| | Definition of dy, dn, and dv | | |
|---|---|---|---|
| i | dy[i] | du[i] | dv[i] |
| 0 | 0 | 0 | 0 |
| 1 | 0 | 0 | (max_value_v + 1) >> (1 + layer) |
| 2 | 0 | (max_value_u + 1) >> (1 + layer) | 0 |
| 3 | 0 | (max_value_u + 1) >> (1 + layer) | (max_value_v + 1) >> (1 + layer) |

TABLE 4-continued

Definition of dy, dn, and dv

| i | dy[i] | du[i] | dv[i] |
|---|---|---|---|
| 4 | (max_value_y + 1) >> (1 + layer) | 0 | 0 |
| 5 | (max_value_y + 1) >> (1 + layer) | 0 | (max_value_v + 1) >> (1 + layer) |
| 6 | (max_value_y + 1) >> (1 + layer) | (max_value_u + 1) >> (1 +layer) | 0 |
| 7 | (max_value_y + 1) >> (1 + layer) | (max_value_u + 1) >> (1 +layer) | (max_value_v + 1) >> (1 + layer) |

The new function getVertex(y, u, v, i) may be used to derive the vertex index of the octant whose first vertex may be located at (y, u, v). The function getVertex(y, u, v, i) may be calculated using the following pseudo code:

```
getVertex (y, u, v, i) {
    getdy[i], du[i], dv[i] using Table 4 depending on the value of i
    octant_len_y = (max_value_y+1)>>num_layers_minus1
    octant_len_u = (max_value_u+1)>>num_layers_minus1
    octant_len_v = (max_value_v+1)>>num_layers_minus1
    size_in_vertices = 1+ (1<<num_layers_minus1)
    n = ((y+(dy[i]<<1))/octant_len_y)*size_in_vertices*size_in_vertices +
        ((u+(du[i]<<1))/octant_len_u)*size_in_vertices + ((v+(dv[I]<<1))/octant_len_v)
}.
```

The values of octant_len_y, octant_len_u and octant_len_v may represent the length of smallest octant for luma, color component u and color component v, respectively. The value of size_in_vertices may be the maximal number of vertices for each dimension.

The flag coded flag[n] may be set (e.g., once the value of n may be calculated using getVertex(y, u, v, i)). The flag may be used subsequently to track that the vertex "n" may have been coded and/or to avoid coding the vertex "n" again.

Sequence and picture level 3D LUT signaling may also be provided and/or used. For example, for 3D LUT signaling, the system may signal 3D LUT based on sequence level analysis. This may be a global or sequence level 3D LUT. Such sequence level 3D LUT may be conveyed in high level parameter sets such as Video Parameter Set (VPS), Sequence Parameter Set (SPS) or Picture Parameter Set (PPS). Pictures in the video sequence may use the global 3D LUT.

Table 5 shows an exemplary syntax table that signals the global 3D LUT in the PPS. In addition to using 3D LUT, the syntax in Table 5 may support using other types of color gamut conversion methods such as linear mapping, piecewise linear mapping, and/or the like. The specific color gamut conversion method may be coded into the PPS using ue(v) coding, which may enable additional color gamut conversion methods to be supported. Additionally, Table 5 includes a flag (color_gamut_scalability_flag) to indicate whether syntax elements to support color gamut scalability may be included. Although whether CGS may be supported between two specific layers or not may be signaled in the VPS (e.g., using a scalability_mask), it may be desirable to have parsing independency between the VSP and the PPS. Therefore, an additional 1-bit flag in the PPS may be included as in Table 5 to indicate CGS.

TABLE 5

Signaling global 3D LUT (using PPS as example)

| | Descriptor |
|---|---|
| picture_param_set{ | |
|     color_gamut_scalability_flag | u(1) |
|     if (color gamut scalability_flag) { | |
|         color_gamut_conversion_method | ue(v) |
| if (color_gamut_converstion_method == LINEAR) | |
|         Signal linear mapping information | |
|         else if (color_gamut_converstion_method == PIECEWISE_LINEAR ) | |
|         Signal piece linear mapping information | |
|         else if (color_gamut_converstion_method == 3D_LUT ) | |
|         3D_LUT ( 0, 0, 0, 0 ) | |
|         else if (color_gamut_converstion_method == POLYNOMIAL ) | |
|         Signal polynomial model order and cofficients | |
|         ... | |
| } | |

As shown, a color_gamut_scalability_flag may be provided. The color_gamut_scalability_flag may be used to indicate whether mapping information related to color gamut scalability may be present or not.

A color_gamut_conversion_method may also be used to indicate the specific method used to perform color gamut conversion between two layers. The set of color gamut conversion methods may include linear mapping, piecewise linear, 3D LUT, polynomial model, etc. When the color_gamut_conversion_method may be set to 3D LUT, the 3D_LUT( ) signaling as defined in Table 2 may be used.

For one or more pictures in the video sequence, the encoder may decide to signal picture level 3D LUT in the bitstream (e.g., to further improve scalable coding efficiency). This updated 3D LUT information may be signaled inside the slice segment header along with the coded slice data and/or it may be signaled in a separate NAL unit such as Adaption Parameter Set (APS). To distinguish from the global 3D LUT, the latter case may be the picture level 3D LUT.

TABLE 6

Signaling picture level 3D LUT (using slice segment header as example)

| | Descriptor |
|---|---|
| slice_segment_header{ | |
| ... | |
| else if (color_gamut_converstion_method == 3D_LUT ) { | |
| 3D_LUT_present_flag | u(1) |
| if(3D_LUT_present_flag) | |
| 3D_LUT ( 0, 0, 0, 0 ) | |
| ... | |
| } | |

A 3D_LUT_present_flag may be used to indicate whether picture level 3D LUT information may be present or not.

Figure 9A:
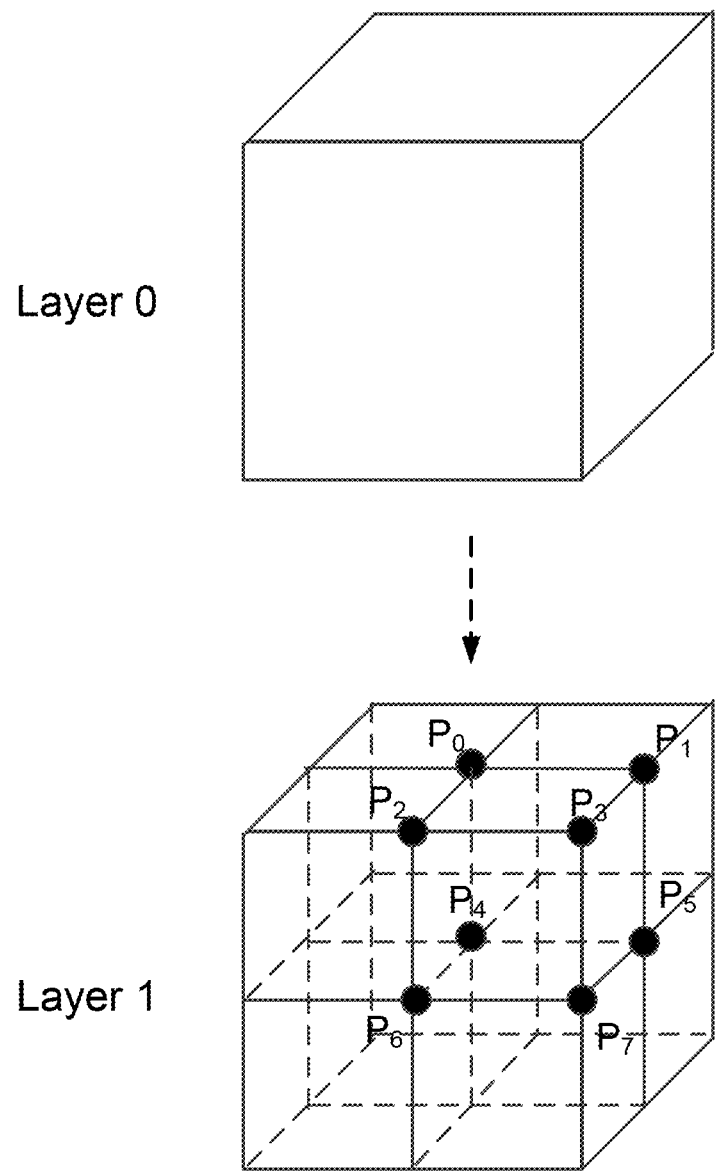
FIGS. 9A-9B illustrate a global 3D LUT with two layers and a picture level 3D LUT with three layers, respectively, where the picture level 3D LUT with three layers may be predicted from the coarser global 3D LUT with two layers.
Figure 9B:
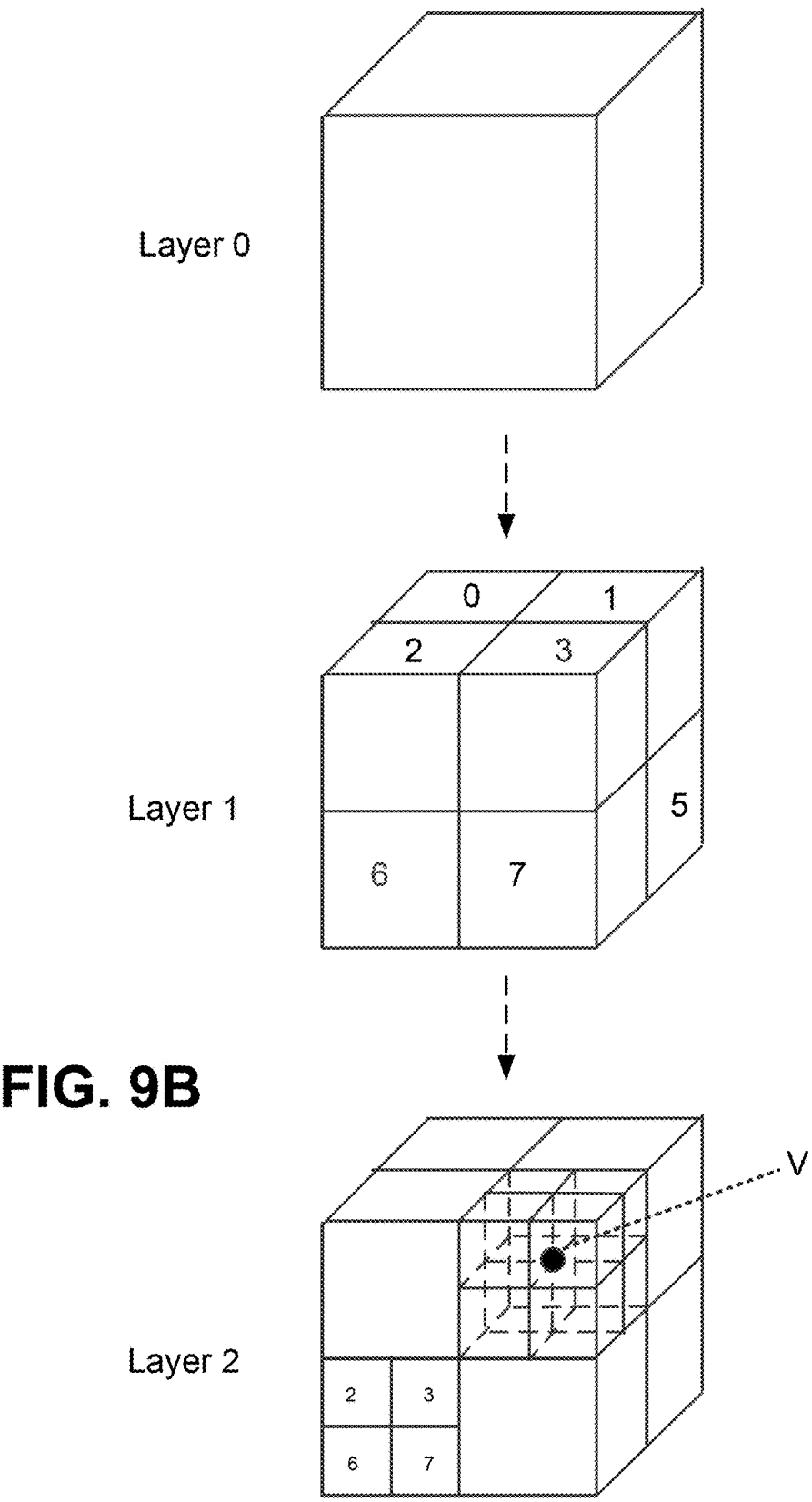

The picture level 3D LUT may be coded by predicting from parent vertices in the current 3D LUT, it may be coded using the global 3D LUT as its prediction, and/or it may use both as prediction and to signal the prediction mode at the vertex level. This may be achieved by setting the value of prediction_mode in Table 2 to the appropriate value. A picture level 3D LUT may have a different number of layers compared to the global 3D LUT. For example, it may have more layers, making the picture level 3D LUT more accurate, which may in turn improve the color gamut conversion process and therefore the enhancement layer coding efficiency. If the picture level 3D LUT has more layers than the sequence level 3D LUT, it may be beneficial to code it using the sequence level 3D LUT as prediction. In this case, those collocated vertices that may not already exist in the global 3D LUT may be derived by trilinear interpolation from its neighboring vertices that already exist in the global 3D LUT. FIGS. 9A-9B show such an example, where the picture level 3D LUT (FIG. 9B) may have 3 layers and the global 3D LUT (FIG. 9A) may have 2 layers and may be used as a prediction. When the vertex V at layer 2 in the picture level 3D LUT may be coded, the prediction may be trilinear interpolated from the neighboring vertices P0, P1, . . . P7 at layer 1 in global 3D LUT.

Figure 10A:
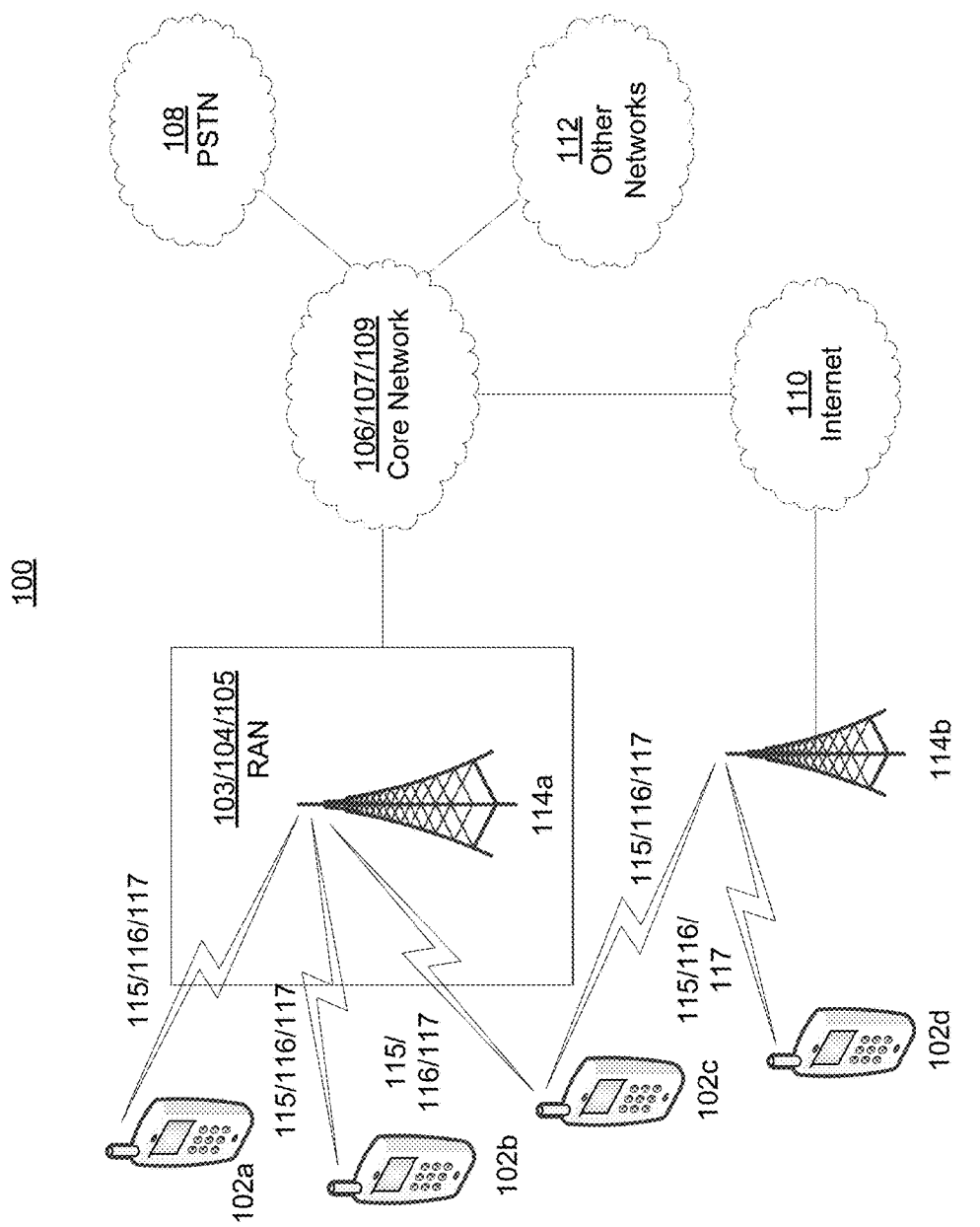
FIG. 10A depicts a diagram of an example communications system in which one or more disclosed embodiments may be implemented.

FIG. 10A depicts a diagram of an example communications system 100 in which one or more disclosed embodiments may be implemented and/or may be used. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 10A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 10A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 10A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 10A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 10A may be configured to communicate with the base station 114a, which may employ a cellular-based radio technology, and with the base station 114b, which may employ an IEEE 802 radio technology.

Figure 10B:
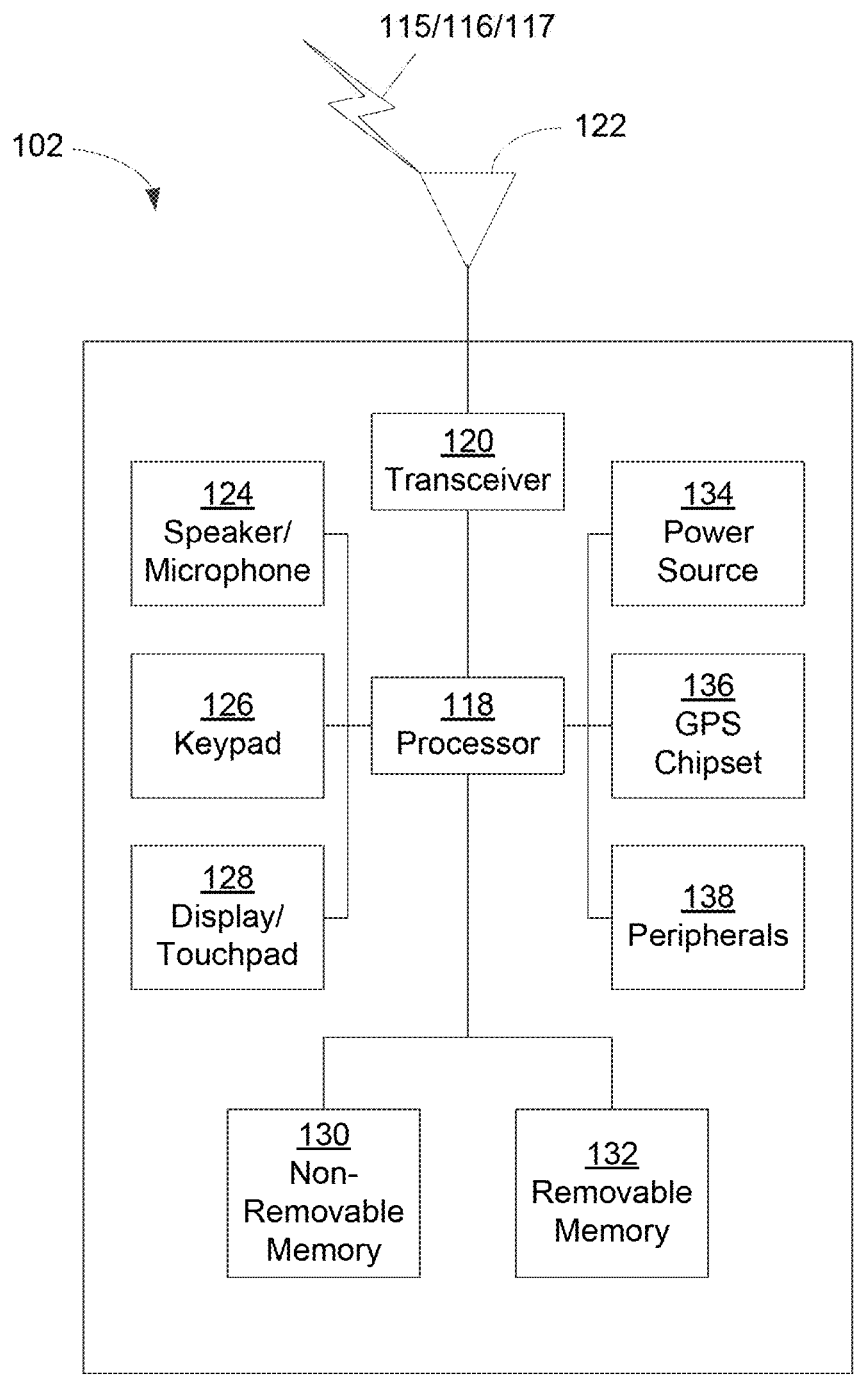
FIG. 10B depicts a system diagram of an example wireless transmit/receive unit (WTRU) that may be used within the communications system illustrated in FIG. 10A.

FIG. 10B depicts a system diagram of an example WTRU 102. As shown in FIG. 10B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 10B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 10B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 10B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10C:
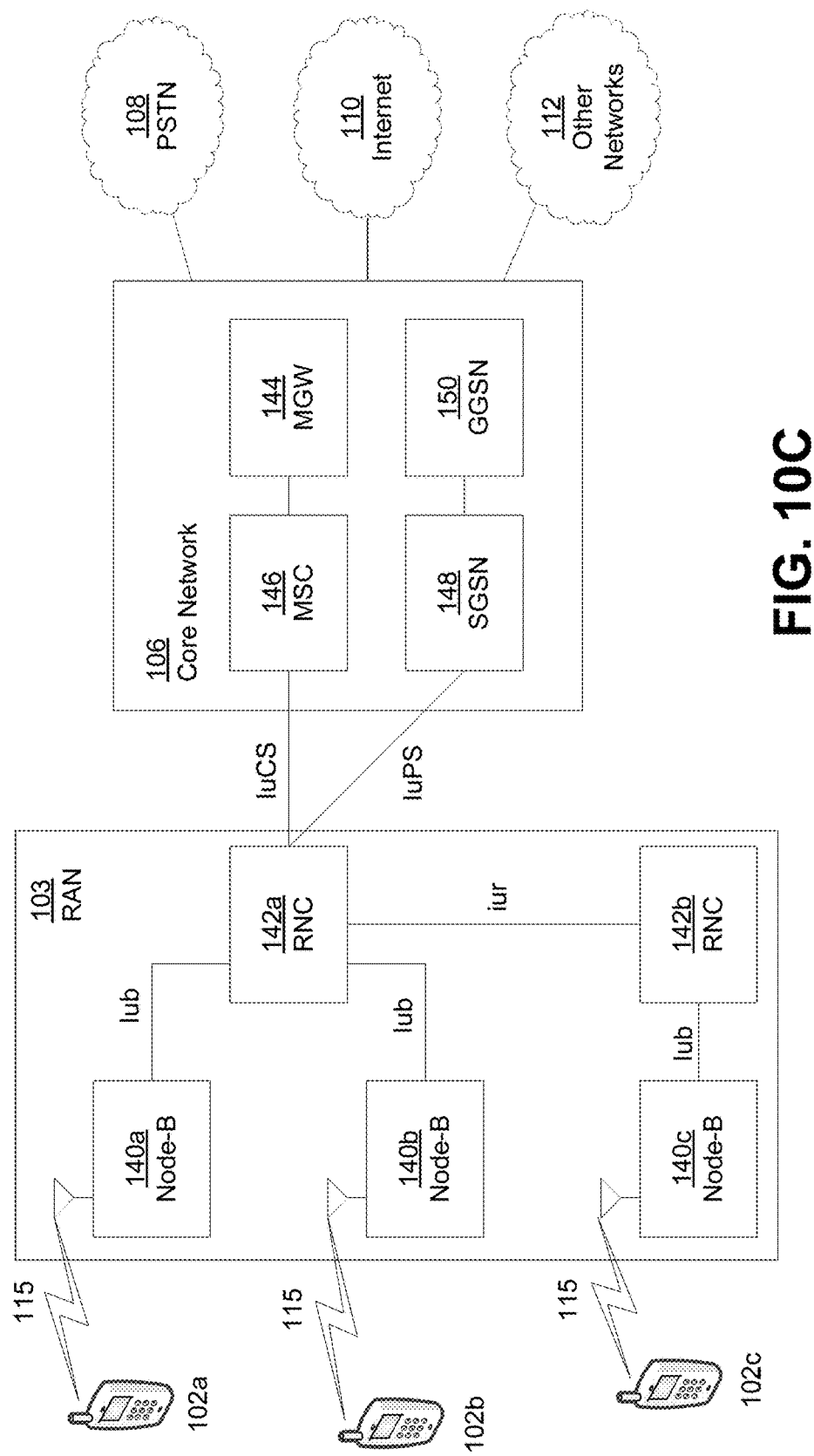
FIG. 10C depicts a system diagram of an example radio access network and an example core network that may be used within the communications system illustrated in FIG. 10A.

FIG. 10C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 10C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 10C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 10C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 10D:
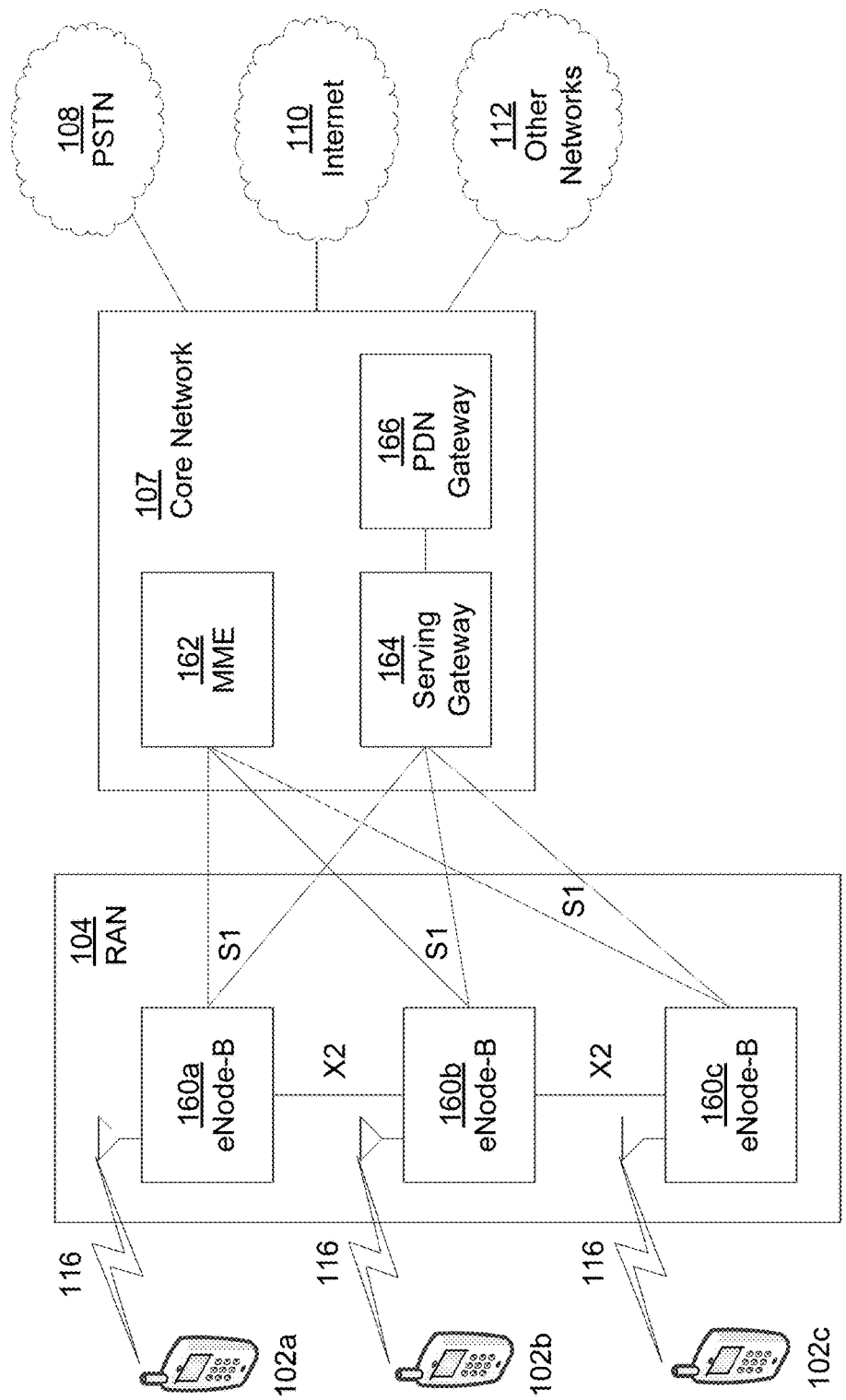
FIG. 10D depicts a system diagram of another example radio access network and an example core network that may be used within the communications system illustrated in FIG. 10A.

FIG. 10D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 10D, the eNode-Bs 160a, 160b, and/or 160c may communicate with one another over an X2 interface.

The core network 107 shown in FIG. 10D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 10E:
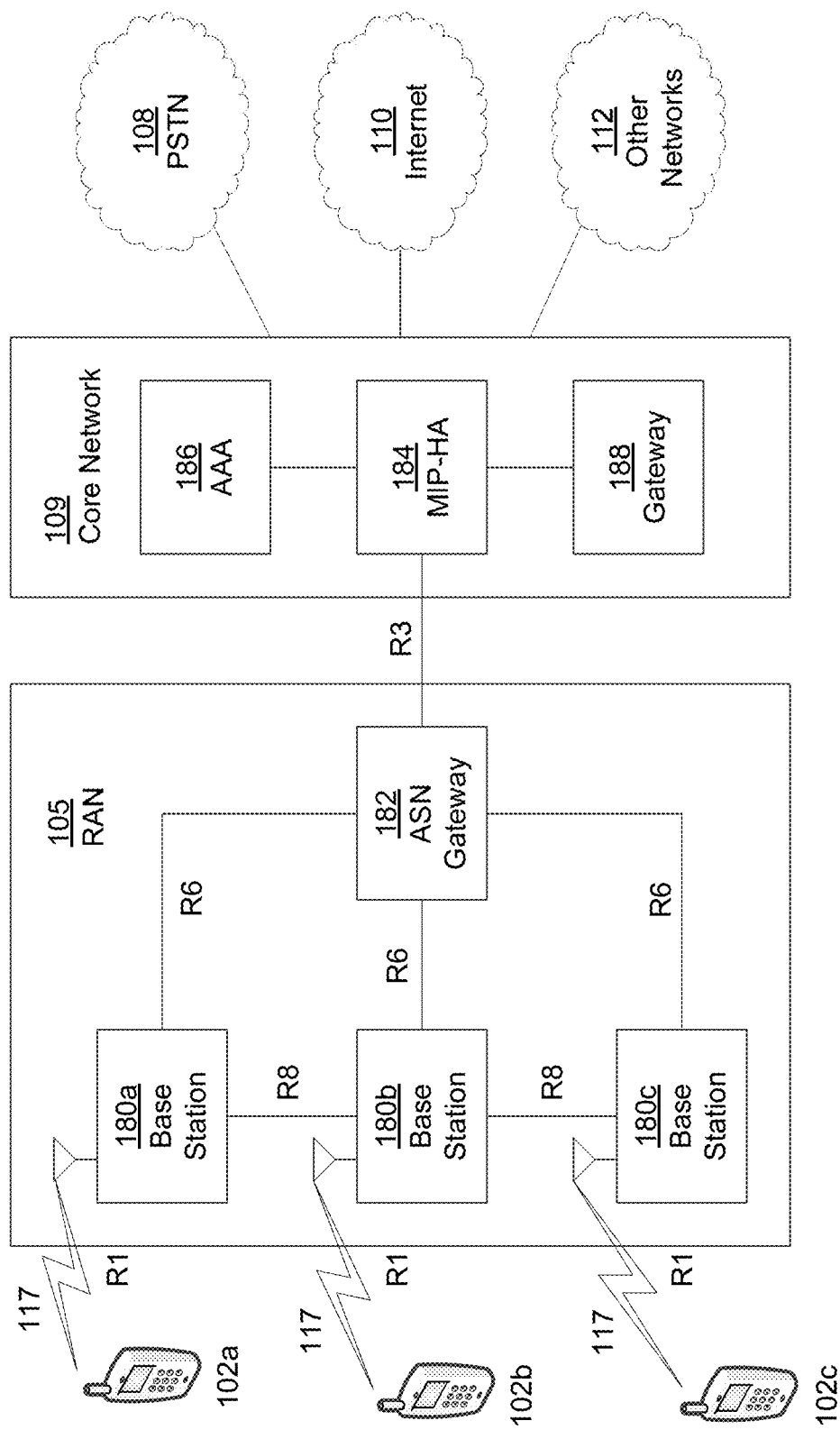
FIG. 10E depicts a system diagram of another example radio access network and an example core network that may be used within the communications system illustrated in FIG. 10A.

FIG. 10E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 10E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 10E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 10E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
receiving a color mapping table that is partitioned into a plurality of segments, a segment corresponding to a portion of a color space, the color mapping table having a plurality of color mapping coefficient parameters that are associated with various vertices of the plurality of segments;
determining whether a first vertex of a first segment has been decoded based on a vertex coding tracking indicator associated with first vertex; and
based on a determination that the first vertex has yet to be decoded, parsing color mapping coefficient parameters associated with first vertex.

2. The method of claim 1, further comprising:
deriving a vertex index of the first vertex; and
determining a value of the vertex coding tracking indicator associated with the first vertex based on the vertex index of the first vertex, wherein whether the first vertex has been decoded is determined based on the value of the vertex coding tracking indicator associated with the first vertex.

3. The method of claim 1, wherein the color mapping table comprises a plurality of vertices, each segment is associated with a subset of the plurality of vertices, at least one of the plurality of vertices is associated with more than one segment, and the method further comprising:
deriving a vertex index that uniquely identifies the first vertex based on a position of the first vertex in the color space, wherein whether the first vertex has been decoded is determined based on the vertex index of the first vertex.

4. The method of claim 1, further comprising:
upon parsing color mapping coefficient parameters associated with first vertex, setting the vertex coding tracking indicator associated with first vertex to a value that indicates the first vertex has been decoded.

5. The method of claim 1, further comprising:
determining whether a second vertex of the first segment has been decoded based on a vertex coding tracking indicator associated with second vertex; and
based on a determination that the second vertex has been decoded, bypassing parsing color mapping coefficient parameters associated with second vertex.

6. The method of claim 1, further comprising:
determining whether a second vertex of the first segment has been decoded based on a vertex coding tracking indicator associated with second vertex; and
based on a determination that the second vertex has been decoded, determining whether a third vertex of the first segment has been decoded.

7. The method of claim 1, wherein a color mapping coefficient parameter associated with first vertex indicates a color mapping coefficient residual value.

8. The method of claim 1, wherein the color mapping table is a 3D look-up table (LUT).

9. The method of claim 1, wherein the first segment is an octant in the color space.

10. A video decoding device comprising:
a processor configured to:
receive a color mapping table that is partitioned into a plurality of segments, a segment corresponding to a portion of a color space, the color mapping table having a plurality of color mapping coefficient parameters that are associated with various vertices of the plurality of segments;
determine whether a first vertex of a first segment has been decoded based on a vertex coding tracking indicator associated with first vertex; and
based on a determination that the first vertex has yet to be decoded, parse color mapping coefficient parameters associated with first vertex.

11. The video decoding device of claim 10, wherein the processor is further configured to:
derive a vertex index of the first vertex; and
determine a value of the vertex coding tracking indicator associated with the first vertex based on the vertex index of the first vertex, wherein whether the first vertex has been decoded is determined based on the value of the vertex coding tracking indicator associated with the first vertex.

12. The video decoding device of claim 10, wherein the color mapping table comprises a plurality of vertices, each segment is associated with a subset of the plurality of vertices, at least one of the plurality of vertices is associated with more than one segment, and the processor is further configured to:
derive a vertex index that uniquely identifies the first vertex based on a position of the first vertex in the color space, wherein whether the first vertex has been decoded is determined based on the vertex index of the first vertex.

13. The video decoding device of claim 10, wherein the processor is further configured to:
upon parsing color mapping coefficient parameters associated with first vertex, set the vertex coding tracking indicator associated with first vertex to a value that indicates the first vertex has been decoded.

14. The video decoding device of claim 10, wherein the processor is further configured to:

determine whether a second vertex of the first segment has been decoded based on a vertex coding tracking indicator associated with second vertex; and based on a determination that the second vertex has been decoded, bypass parsing color mapping coefficient parameters associated with second vertex.

16. The video decoding device of claim 10, wherein the processor is further configured to:

determine whether a second vertex of the first segment has been decoded based on a vertex coding tracking indicator associated with second vertex; and based on a determination that the second vertex has been decoded, determine whether a third vertex of the first segment has been decoded.

16. The video decoding device of claim 10, wherein a color mapping coefficient parameter associated with first vertex indicates a color mapping coefficient residual value.

17. The video decoding device of claim 10, wherein the color mapping table is a 3D look-up table (LUT).

18. The video decoding device of claim 10, wherein the first segment is an octant in the color space.

\* \* \* \* \*